US011964478B2

(12) United States Patent
Murayama et al.

(10) Patent No.: US 11,964,478 B2
(45) Date of Patent: Apr. 23, 2024

(54) DRIVE WAVEFORM DETERMINATION METHOD, NON-TRANSITORY COMPUTER-READABLE STORAGE MEDIUM STORING DRIVE WAVEFORM DETERMINATION PROGRAM, AND DRIVE WAVEFORM DETERMINATION SYSTEM

(71) Applicant: SEIKO EPSON CORPORATION, Tokyo (JP)

(72) Inventors: Toshiro Murayama, Fujimi-Machi (JP); Atsushi Toyofuku, Shiojiri (JP); Shunya Fukuda, Azumino (JP); Takahiro Katakura, Okaya (JP)

(73) Assignee: Seiko Epson Corporation, Tokyo (JP)

( * ) Notice: Subject to any disclaimer, the term of this patent is extended or adjusted under 35 U.S.C. 154(b) by 175 days.

(21) Appl. No.: 17/650,131

(22) Filed: Feb. 7, 2022

(65) Prior Publication Data

US 2022/0250379 A1 Aug. 11, 2022

(30) Foreign Application Priority Data

Feb. 8, 2021 (JP) ................................. 2021-018190

(51) Int. Cl.
*B41J 2/045* (2006.01)

(52) U.S. Cl.
CPC ....... *B41J 2/04556* (2013.01); *B41J 2/04541* (2013.01); *B41J 2/04588* (2013.01); *B41J 2/04581* (2013.01)

(58) Field of Classification Search
CPC ..... B41J 2/045; B41J 2/01; B41J 2/015; B41J 25/308; G06F 15/00
See application file for complete search history.

(56) References Cited

U.S. PATENT DOCUMENTS

| | | | | |
|---|---|---|---|---|
| 7,021,732 B2 * | 4/2006 | Folkins | B41J 2/2135 | 347/19 |
| 2003/0048331 A1 * | 3/2003 | Takahashi | B41J 2/0456 | 347/57 |
| 2005/0179739 A1 * | 8/2005 | Freire | B41J 2/04598 | 347/61 |
| 2009/0231614 A1 * | 9/2009 | Oku | H04N 1/1933 | 358/1.15 |
| 2011/0134176 A1 * | 6/2011 | Matsuo | B41J 2/04581 | 347/10 |
| 2013/0182026 A1 * | 7/2013 | Satake | B41J 2/04581 | 347/10 |
| 2015/0116401 A1 * | 4/2015 | Somete | B41J 2/04581 | 347/10 |
| 2022/0153022 A1 * | 5/2022 | Toyofuku | B41J 2/04588 | |

FOREIGN PATENT DOCUMENTS

JP 2010-131910 A 6/2010

* cited by examiner

*Primary Examiner* — John Zimmermann
(74) *Attorney, Agent, or Firm* — WORKMAN NYDEGGER

(57) ABSTRACT

A waveform determination method is disclosed that includes acquiring second timing information regarding a timing at which the flight distance of the droplet reaches the first distance when each of the plurality of waveform candidates indicated by the second waveform information is used, and a determination step of determining a waveform of each of the first drive pulse and the second drive pulse based on the first timing information and the second timing information.

19 Claims, 12 Drawing Sheets

FIG. 5

| DRIVE PULSE PD | DROPLET DR | DISTANCE PG |
|---|---|---|
| FIRST DRIVE PULSE PD1 | FIRST DROPLET DR1 | FIRST DISTANCE PG1 |
| SECOND DRIVE PULSE PD2 | SECOND DROPLET DR2 | FIRST DISTANCE PG1 |
| THIRD DRIVE PULSE PD3 | FIRST DROPLET DR1 | SECOND DISTANCE PG2 |
| FOURTH DRIVE PULSE PD4 | SECOND DROPLET DR2 | SECOND DISTANCE PG2 |

FIG. 12

| DRIVE PULSE PD | DROPLET DR | DISTANCE PG |
|---|---|---|
| FIRST DRIVE PULSE PD1 | FIRST DROPLET DR1 | FIRST DISTANCE PG1 |
| SECOND DRIVE PULSE PD2 | SECOND DROPLET DR2 | FIRST DISTANCE PG1 |
| FIFTH DRIVE PULSE PD5 | THIRD DROPLET DR3 | FIRST DISTANCE PG1 |
| THIRD DRIVE PULSE PD3 | FIRST DROPLET DR1 | SECOND DISTANCE PG2 |
| FOURTH DRIVE PULSE PD4 | SECOND DROPLET DR2 | SECOND DISTANCE PG2 |
| SIXTH DRIVE PULSE PD6 | THIRD DROPLET DR3 | SECOND DISTANCE PG2 |

DRIVE WAVEFORM DETERMINATION METHOD, NON-TRANSITORY COMPUTER-READABLE STORAGE MEDIUM STORING DRIVE WAVEFORM DETERMINATION PROGRAM, AND DRIVE WAVEFORM DETERMINATION SYSTEM

The present application is based on, and claims priority from JP Application Serial Number 2021-018190, filed Feb. 8, 2021, the disclosure of which is hereby incorporated by reference herein in its entirety.

BACKGROUND

1. Technical Field

The present disclosure relates to a drive waveform determination method, a non-transitory computer-readable storage medium storing a drive waveform determination program, and a drive waveform determination system.

2. Related Art

In liquid ejecting apparatuses such as an ink jet printer, generally, a liquid such as ink is ejected from a nozzle by applying a drive pulse to a drive element such as a piezoelectric element. Here, a waveform of the drive pulse is determined so that the ink ejection characteristic from the nozzle becomes a desired characteristic.

In a technique described in JP-A-2010-131910, ejection characteristics are measured by changing a plurality of parameters for determining a drive waveform, which is a waveform of a drive pulse, and based on results of the measurement, the parameters of the drive waveform actually used are determined so that the velocity of ink droplets ejected from the nozzles is constant regardless of the number of nozzles used.

The flying ink droplets after being ejected from the nozzles are decelerated due to air resistance and the like, but the deceleration varies depending on the mass of the ink droplets and the cross-sectional area when viewed in the ejection direction. The mass and cross-sectional area of the ink droplets vary depending on the volume of the ejected ink droplets. Therefore, in the technique according to JP-A-2010-131910, when a plurality of ink droplets having different volumes are used, even though the initial velocities of the plurality of ink droplets are equal to each other, the lengths of time required for the plurality of ink droplets to land on a recording medium from the nozzles are different from each other. As a result, under the printing method in which the relative positions of the nozzle and the recording medium change, even though the landing position of one ink droplet on the recording medium is a desired position among the plurality of ink droplets, there is a problem that the landing position of other ink droplets on the recording medium deviates from the desired position.

SUMMARY

According to an aspect of the present disclosure, there is provided a drive waveform determination method for determining a waveform of a drive pulse applied to a drive element provided in a liquid ejecting head that ejects a liquid as a droplet toward a recording medium. The drive waveform determination method includes: a first acquisition step of acquiring first waveform information regarding a plurality of waveform candidates of a first drive pulse applied to the drive element to eject a first droplet from the liquid ejecting head toward a recording medium located at a position separated by a first distance from the liquid ejecting head, and acquiring second waveform information regarding a plurality of waveform candidates of a second drive pulse applied to the drive element to eject a second droplet having a size larger than that of the first droplet from the liquid ejecting head toward the recording medium located at the position separated by the first distance from the liquid ejecting head; a second acquisition step of acquiring first timing information regarding a timing at which a flight distance of the droplet from the liquid ejecting head reaches the first distance when each of the plurality of waveform candidates indicated by the first waveform information is used as the waveform of the drive pulse applied to the drive element, and acquiring second timing information regarding a timing at which the flight distance of the droplet from the liquid ejecting head reaches the first distance when each of the plurality of waveform candidates indicated by the second waveform information is used as the waveform of the drive pulse applied to the drive element; and a determination step of determining a waveform of each of the first drive pulse and the second drive pulse based on the first timing information and the second timing information.

According to another aspect of the present disclosure, there is provided a non-transitory computer-readable storage medium storing a drive waveform determination program for determining a waveform of a drive pulse applied to a drive element provided in a liquid ejecting head that ejects a liquid as a droplet toward a recording medium. The drive waveform determination program causes a computer to realize: a first acquisition function of acquiring first waveform information regarding a plurality of waveform candidates of a first drive pulse applied to the drive element to eject a first droplet from the liquid ejecting head toward a recording medium located at a position separated by a first distance from the liquid ejecting head, and acquiring second waveform information regarding a plurality of waveform candidates of a second drive pulse applied to the drive element to eject a second droplet having a size larger than that of the first droplet from the liquid ejecting head toward the recording medium located at the position separated by the first distance from the liquid ejecting head; a second acquisition function of acquiring first timing information regarding a timing at which a flight distance of the droplet from the liquid ejecting head reaches the first distance when each of the plurality of waveform candidates indicated by the first waveform information is used as the waveform of the drive pulse applied to the drive element, and acquiring second timing information regarding a timing at which the flight distance of the droplet from the liquid ejecting head reaches the first distance when each of the plurality of waveform candidates indicated by the second waveform information is used as the waveform of the drive pulse applied to the drive element; and a determination function of determining a waveform of each of the first drive pulse and the second drive pulse based on the first timing information and the second timing information.

According to still another aspect of the present disclosure, there is provided a drive waveform determination system including: a liquid ejecting head that includes a drive element and ejects a liquid as a droplet toward a recording medium by driving the drive element; and a processing circuit that performs processing of determining a waveform of a drive pulse applied to the drive element. The processing circuit executes a first acquisition step of acquiring first waveform information regarding a plurality of waveform candidates of a first drive pulse applied to the drive element to eject a first droplet from the liquid ejecting head toward a recording medium located at a position separated by a first distance from the liquid ejecting head, and acquiring second waveform information regarding a plurality of waveform candidates of a second drive pulse applied to the drive element to eject a second droplet having a size larger than that of the first droplet from the liquid ejecting head toward the recording medium located at the position separated by the first distance from the liquid ejecting head, a second acquisition step of acquiring first timing information regarding a timing at which a flight distance of the droplet from the liquid ejecting head reaches the first distance when each of the plurality of waveform candidates indicated by the first waveform information is used as the waveform of the drive pulse applied to the drive element, and acquiring second timing information regarding a timing at which the flight distance of the droplet from the liquid ejecting head reaches the first distance when each of the plurality of waveform candidates indicated by the second waveform information is used as the waveform of the drive pulse applied to the drive element, and a determination step of determining a waveform of each of the first drive pulse and the second drive pulse based on the first timing information and the second timing information.

BRIEF DESCRIPTION OF THE DRAWINGS

FIG. 5 is a diagram showing a relationship between a drive pulse, a droplet, and a distance from a nozzle to a recording medium.

FIG. 12 is a diagram showing a relationship between a drive pulse, a droplet, and a distance from a nozzle to a recording medium in the second embodiment.

DESCRIPTION OF EXEMPLARY EMBODIMENTS

Figure 1:
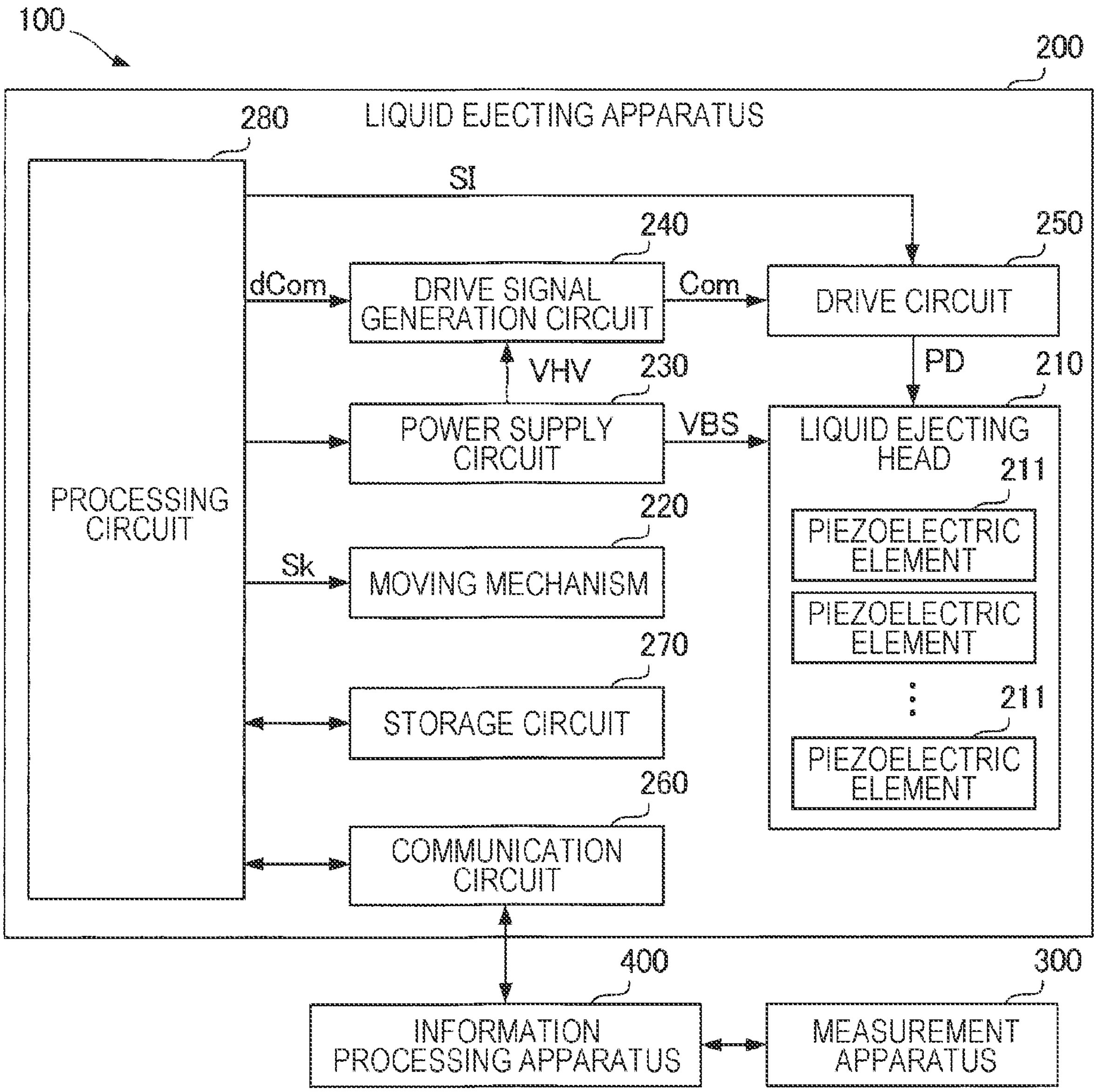
FIG. 1 is a schematic diagram showing a configuration example of a drive waveform determination system according to a first embodiment.

Hereinafter, preferred embodiments according to the present disclosure will be described with reference to the accompanying drawings. In the drawings, the dimensions and scale of each section are appropriately different from the actual ones, and some parts are schematically shown for easy understanding. Further, the scope of the present disclosure is not limited to these forms unless it is stated in the following description that the present disclosure is particularly limited.

1. First Embodiment

1-1. Outline of Drive Waveform Determination System 100

FIG. 1 is a schematic diagram showing a configuration example of a drive waveform determination system 100 according to a first embodiment. The drive waveform determination system 100 determines a waveform of a drive pulse PD used when ejecting ink, which is an example of a liquid.

As shown in FIG. 1, the drive waveform determination system 100 includes a liquid ejecting apparatus 200, a measurement apparatus 300, and an information processing apparatus 400 which is an example of a "computer". Hereinafter, these apparatuses will be described in order.

1-1a. Liquid Ejecting Apparatus 200

The liquid ejecting apparatus 200 is a printer that performs printing on a recording medium by an ink jet method. The recording medium may be any medium as long as it can be printed by the liquid ejecting apparatus 200, and is not particularly limited, and is, for example, various papers, various cloths, various films, and the like. The liquid ejecting apparatus 200 may be a serial type printer or a line type printer.

As shown in FIG. 1, the liquid ejecting apparatus 200 includes a liquid ejecting head 210, a moving mechanism 220, a power supply circuit 230, a drive signal generation circuit 240, a drive circuit 250, a communication circuit 260, a storage circuit 270, and a processing circuit 280.

The liquid ejecting head 210 ejects ink toward the recording medium. In FIG. 1, a plurality of piezoelectric elements 211, which are an example of a "drive element", are shown as components of the liquid ejecting head 210. Although not shown, the liquid ejecting head 210 includes a cavity for accommodating ink, and a nozzle communicating with the cavity in addition to the piezoelectric elements 211. Here, the piezoelectric element 211 is provided for each cavity, and ink is ejected from the nozzle corresponding to the cavity by changing the pressure of the cavity. In addition, instead of the piezoelectric element 211, a heater that heats the ink in the cavity may be used as the drive element.

In the example shown in FIG. 1, the number of liquid ejecting heads 210 in the liquid ejecting apparatus 200 is one, but the number may be two or more. In this case, for example, two or more liquid ejecting heads 210 are unitized. When the liquid ejecting apparatus 200 is a serial type, the liquid ejecting head 210 or a unit including two or more liquid ejecting heads 210 is used so that a plurality of nozzles are distributed over a part of the recording medium in a width direction. When the liquid ejecting apparatus 200 is a line type, a unit including two or more liquid ejecting heads 210 is used so that a plurality of nozzles are distributed over the entire recording medium in the width direction.

The moving mechanism 220 changes a relative position of the liquid ejecting head 210 and the recording medium. More specifically, when the liquid ejecting apparatus 200 is a serial type, the moving mechanism 220 includes a transport mechanism for transporting a recording medium in a predetermined direction and a moving mechanism that repeatedly moves the liquid ejecting head 210 along an axis orthogonal to a transport direction of the recording medium. When the liquid ejecting apparatus 200 is a line type, the moving mechanism 220 includes a transport mechanism that transports the recording medium in a direction intersecting a longitudinal direction of the unit including the two or more liquid ejecting heads 210.

The power supply circuit 230 receives electric power supplied from a commercial power supply (not shown) and generates various predetermined potentials. The various potentials generated are appropriately supplied to each section of the liquid ejecting apparatus 200. For example, the power supply circuit 230 generates a power supply potential VHV and an offset potential VBS. The offset potential VBS is supplied to the liquid ejecting head 210 and the like. The power supply potential VHV is supplied to the drive signal generation circuit 240 and the like.

The drive signal generation circuit 240 is a circuit that generates a drive signal Com for driving each piezoelectric element 211 in the liquid ejecting head 210. Specifically, the drive signal generation circuit 240 includes, for example, a DA conversion circuit and an amplifier circuit. In the drive signal generation circuit 240, the DA conversion circuit converts a waveform designation signal dCom to be described later from the processing circuit 280 from a digital signal to an analog signal, and the amplifier circuit generates a drive signal Com by amplifying the analog signal using the power supply potential VHV from the power supply circuit 230. Here, among the waveforms included in the drive signal Com, the signal of the waveform actually supplied to the piezoelectric element 211 is the drive pulse PD. The drive pulse PD will be described in detail later.

The drive circuit 250 switches whether or not to supply at least a part of the waveform included in the drive signal Com as the drive pulse PD for each of the plurality of piezoelectric elements 211 based on a control signal SI to be described later. The drive circuit 250 is an integrated circuit (IC) chip that outputs a drive signal and a reference voltage for driving each piezoelectric element 211.

The communication circuit 260 is a communication device that is communicably connected to the information processing apparatus 400. The communication circuit 260 includes interfaces such as a universal serial bus (USB) and a local area network (LAN), for example. The communication circuit 260 may be wirelessly connected to the information processing apparatus 400 by, for example, Wi-Fi, Bluetooth, or the like, and may be connected to the information processing apparatus 400 via a local area network (LAN), the Internet, or the like. Note that, Wi-Fi and Bluetooth are registered trademarks, respectively.

The storage circuit 270 stores various programs executed by the processing circuit 280 and various data such as print data processed by the processing circuit 280. The storage circuit 270 includes, for example, one or both semiconductor memories of a volatile memory such as a random access memory (RAM) and a non-volatile memory such as a read only memory (ROM), an electrically erasable programmable read-only memory (EEPROM), or a programmable ROM (PROM). The print data is supplied from, for example, the information processing apparatus 400. The storage circuit 270 may be configured as a part of the processing circuit 280.

The processing circuit 280 has a function of controlling the operation of each section of the liquid ejecting apparatus 200 and a function of processing various data. The processing circuit 280 includes, for example, one or more processors such as a central processing unit (CPU). The processing circuit 280 may include a programmable logic device such as a field-programmable gate array (FPGA) instead of or in addition to the CPU.

The processing circuit 280 controls the operation of each section of the liquid ejecting apparatus 200 by executing a program stored in the storage circuit 270. Here, the processing circuit 280 generates signals such as control signals Sk and SI, and a waveform designation signal dCom as signals for controlling the operation of each section of the liquid ejecting apparatus 200.

The control signal Sk is a signal for controlling the drive of the moving mechanism 220. The control signal SI is a signal for controlling the drive of the drive circuit 250. Specifically, the control signal SI designates whether or not the drive circuit 250 supplies the drive signal Com from the drive signal generation circuit 240 to the liquid ejecting head 210 as the drive pulse PD for each predetermined unit period. By this designation, the amount of ink ejected from the liquid ejecting head 210 and the like are designated. The waveform designation signal dCom is a digital signal for defining the waveform of the drive signal Com generated by the drive signal generation circuit 240.

1-1b. Measurement Apparatus 300

The measurement apparatus 300 is an apparatus for measuring the ink ejection characteristic from the liquid ejecting head 210. Examples of the ejection characteristics include an ejection velocity, an ejection angle, an ejection amount, the number of satellites, and stability. In the following description, the ink ejection characteristic from the liquid ejecting head 210 may be simply referred to as the "ejection characteristic".

The measurement apparatus 300 of the present embodiment is an imaging apparatus that images the flying ink ejected from the liquid ejecting head 210. Specifically, the measurement apparatus 300 includes, for example, an imaging optical system and an imaging element. The imaging optical system is an optical system including at least one imaging lens, and may include various optical elements such as a prism, or may include a zoom lens, a focus lens, or the like. The imaging element is, for example, a charge coupled device (CCD) image sensor, a complementary MOS (CMOS) image sensor, or the like. A result of imaging from the imaging element is input to the information processing apparatus 400, and the information processing apparatus 400 calculates each ejection characteristic by arithmetic processing using the imaging result. The measurement of the ejection characteristics using the image captured by the measurement apparatus 300 will be described in detail later.

Of the above-mentioned ejection characteristics, the amount of ink can also be measured by using an apparatus that images the ink that has landed on a recording medium or the like without using the measurement apparatus 300, or by using an electronic balance that measures the mass of the ink ejected from the liquid ejecting head 210. Further, the ejection characteristic may be a characteristic relating to an ink ejection state from the liquid ejecting head 210, and is a concept including a driving frequency of the liquid ejecting head 210 and the like in addition to the above-mentioned characteristics. A residual vibration is vibration remaining in an ink flow path in the liquid ejecting head 210 after the piezoelectric element 211 is driven, and is detected as, for example, a voltage signal from the piezoelectric element 211.

1-1c. Information Processing Apparatus 400

The information processing apparatus 400 is a computer that controls the operations of the liquid ejecting apparatus 200 and the measurement apparatus 300. Here, the information processing apparatus 400 is communicably connected to each other by wirelessly or by wire to each of the liquid ejecting apparatus 200 and the measurement apparatus 300. A communication network including a LAN or the Internet may intervene in this connection.

Figure 2:
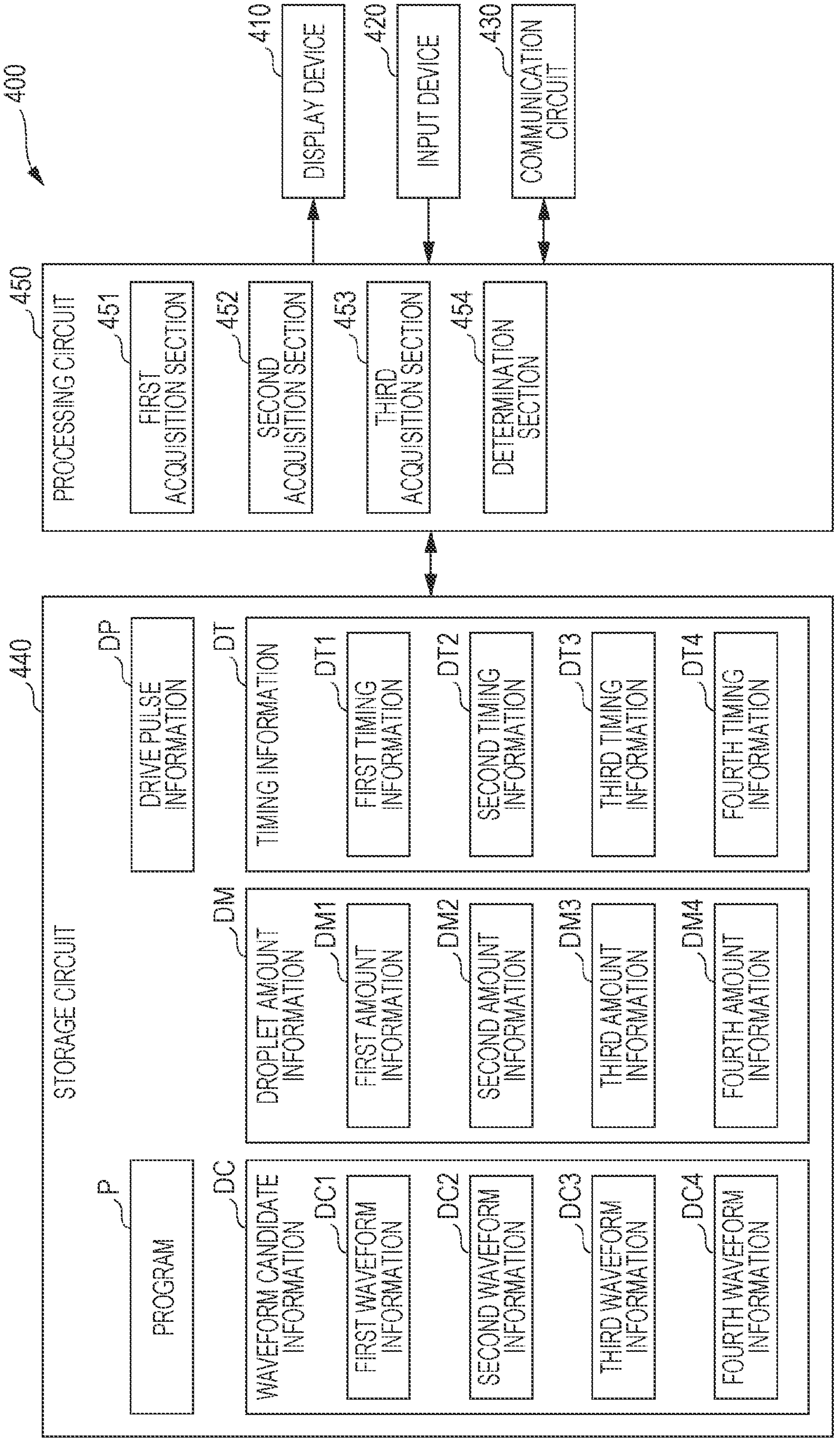
FIG. 2 is a schematic diagram showing a configuration example of an information processing apparatus shown in FIG. 1.

FIG. 2 is a schematic diagram showing a configuration example of the information processing apparatus 400 shown in FIG. 1. The information processing apparatus 400 of the present embodiment is an example of a computer that executes a program P, which is an example of a drive waveform determination program. The program P causes the information processing apparatus 400 to execute a drive waveform determination method for determining the waveform of the drive pulse PD.

As shown in FIG. 2, the information processing apparatus 400 includes a display device 410, an input device 420, a communication circuit 430, a storage circuit 440, and a processing circuit 450. They are communicably connected to each other.

The display device 410 displays various images under the control of the processing circuit 450. Here, the display device 410 has various display panels such as a liquid crystal display panel or an organic electroluminescence (EL) display panel. The display device 410 may be provided outside the information processing apparatus 400. The display device 410 may be a component of the liquid ejecting apparatus 200.

The input device 420 is a device that receives operations from a user. For example, the input device 420 has a pointing device such as a touch pad, a touch panel, or a mouse. Here, when the input device 420 has a touch panel, the input device 420 may also serve as the display device 410. The input device 420 may be provided outside the information processing apparatus 400. The input device 420 may be a component of the liquid ejecting apparatus 200.

The communication circuit 430 is a communication device communicably connected to each of the liquid ejecting apparatus 200 and the measurement apparatus 300. The communication circuit 430 includes interfaces such as USB and LAN, for example. The communication circuit 430 may be wirelessly connected to the liquid ejecting apparatus 200 or the measurement apparatus 300 by, for example, Wi-Fi, Bluetooth, or the like, and may be connected to the liquid ejecting apparatus 200 or the measurement apparatus 300 via the local area network (LAN), the Internet, or the like.

The storage circuit 440 is a device that stores various programs executed by the processing circuit 450 and various data processed by the processing circuit 450. The storage circuit 440 has, for example, a hard disk drive or a semiconductor memory. A part or all of the storage circuit 440 may be provided in a storage device or a server outside the information processing apparatus 400.

The storage circuit 440 of the present embodiment stores the program P, drive pulse information DP, waveform candidate information DC, timing information DT, and droplet amount information DM. In addition to these information and program, the storage circuit 440 may appropriately include information regarding other ejection characteristics, waveforms used for measurement by the measurement apparatus 300, information regarding measurement conditions such as temperature, and the like.

The drive pulse information DP is information regarding the waveform of the drive pulse PD determined by a determination section 454, and is generated by the determination section 454. The drive pulse information DP of the present embodiment includes information regarding waveforms of a first drive pulse PD1, a second drive pulse PD2, a third drive pulse PD3, and a fourth drive pulse PD4, which will be described later.

The waveform candidate information DC is information regarding a plurality of waveform candidates of the drive pulse PD, and is acquired by a first acquisition section 451. As shown in FIG. 2, the waveform candidate information DC of the present embodiment includes first waveform information DC1, second waveform information DC2, third waveform information DC3, and fourth waveform information DC4.

The first waveform information DC1 is information regarding a plurality of waveform candidates of the first drive pulse PD1, which will be described later. The second waveform information DC2 is information regarding a plurality of waveform candidates of the second drive pulse PD2, which will be described later. The third waveform information DC3 is information regarding a plurality of waveform candidates of the third drive pulse PD3, which will be described later. The fourth waveform information DC4 is information regarding a plurality of waveform candidates of the fourth drive pulse PD4, which will be described later.

In the following description, each of the plurality of waveform candidates indicated by the first waveform information DC1 may be referred to as a "first waveform candidate". Each of the plurality of waveform candidates indicated by the second waveform information DC2 may be referred to as a "second waveform candidate". Each of the plurality of waveform candidates indicated by the third waveform information DC3 may be referred to as a "third waveform candidate". Each of the plurality of waveform candidates indicated by the fourth waveform information DC4 may be referred to as a "fourth waveform candidate".

The timing information DT is information regarding a timing at which a flight distance of the droplet ejected from the liquid ejecting head 210 reaches a reference distance, and is generated by a second acquisition section 452. The timing information DT of the present embodiment includes first timing information DT1, second timing information DT2, third timing information DT3, and fourth timing information DT4.

The first timing information DT1 is information regarding a timing at which the flight distance of the droplet from the liquid ejecting head 210 reaches a first distance PG1 to be described later when each of the plurality of waveform candidates indicated by the first waveform information DC1 is used as the waveform of the drive pulse PD. The second timing information DT2 is information regarding a timing at which the flight distance of the droplet from the liquid ejecting head 210 reaches a first distance PG1 to be described later when each of the plurality of waveform candidates indicated by the second waveform information DC2 is used as the waveform of the drive pulse PD. The third timing information DT3 is information regarding a timing at which the flight distance of the droplet from the liquid ejecting head 210 reaches a second distance PG2 longer than a first distance PG1 to be described later when each of the plurality of waveform candidates indicated by the third waveform information DC3 is used as the waveform of the drive pulse PD. The fourth timing information DT4 is information regarding a timing at which the flight distance of the droplet from the liquid ejecting head 210 reaches a second distance PG2 to be described later when each of the plurality of waveform candidates indicated by the fourth waveform information DC4 is used as the waveform of the drive pulse PD.

In the following description, each of the plurality of timings indicated by the first timing information DT1 may be referred to as a "first timing". Each of the plurality of timings indicated by the second timing information DT2 may be referred to as a "second timing". Each of the plurality of timings indicated by the third timing information DT3 may be referred to as a "third timing". Each of the plurality of timings indicated by the fourth timing information DT4 may be referred to as a "fourth timing".

The droplet amount information DM is information regarding the amount of droplets ejected from the liquid ejecting head 210, and is acquired by a third acquisition section 453. The droplet amount information DM of the present embodiment includes first amount information DM1, second amount information DM2, third amount information DM3, and fourth amount information DM4.

The first amount information DM1 is information regarding the amount of droplets from the liquid ejecting head 210 when each of the plurality of waveform candidates indicated by the first waveform information DC1 is used as the waveform of the drive pulse PD. The second amount information DM2 is information regarding the amount of droplets from the liquid ejecting head 210 when each of the plurality of waveform candidates indicated by the second waveform information DC2 is used as the waveform of the drive pulse PD. The third amount information DM3 is information regarding the amount of droplets from the liquid ejecting head 210 when each of the plurality of waveform candidates indicated by the third waveform information DC3 is used as the waveform of the drive pulse PD. The fourth amount information DM4 is information regarding the amount of droplets from the liquid ejecting head 210 when each of the plurality of waveform candidates indicated by the fourth waveform information DC4 is used as the waveform of the drive pulse PD.

In the following description, each of the plurality of amounts indicated by the first amount information DM1 may be referred to as a "first amount". Each of the plurality of amounts indicated by the second amount information DM2 may be referred to as a "second amount". Each of the plurality of amounts indicated by the third amount information DM3 may be referred to as a "third amount". Each of the plurality of amounts indicated by the fourth amount information DM4 may be referred to as a "fourth amount".

The processing circuit 450 is a device having a function of controlling each section of the information processing apparatus 400, the liquid ejecting apparatus 200, and the measurement apparatus 300, and a function of processing various data. The processing circuit 450 has, for example, a processor such as a central processing unit (CPU). The processing circuit 450 may be constituted by a single processor or a plurality of processors. In addition, some or all of the functions of the processing circuit 450 may be realized by hardware such as a digital signal processor (DSP), an application specific integrated circuit (ASIC), a programmable logic device (PLD), and a field programmable gate array (FPGA).

The processing circuit 450 functions as the first acquisition section 451, the second acquisition section 452, the third acquisition section 453, and the determination section 454 by reading and executing the program P from the storage circuit 440.

The first acquisition section 451 has a "first acquisition function" of acquiring the waveform candidate information DC. The second acquisition section 452 has a "second acquisition function" of acquiring the timing information DT. The third acquisition section 453 has a "third acquisition function" of acquiring the droplet amount information DM. The determination section 454 has a "determination function" of determining the waveform of the drive pulse PD. These functions will be described in detail in the description of a drive waveform determination method to be described later.

1-2. Measurement of Ink Ejection Characteristic

Figure 3:
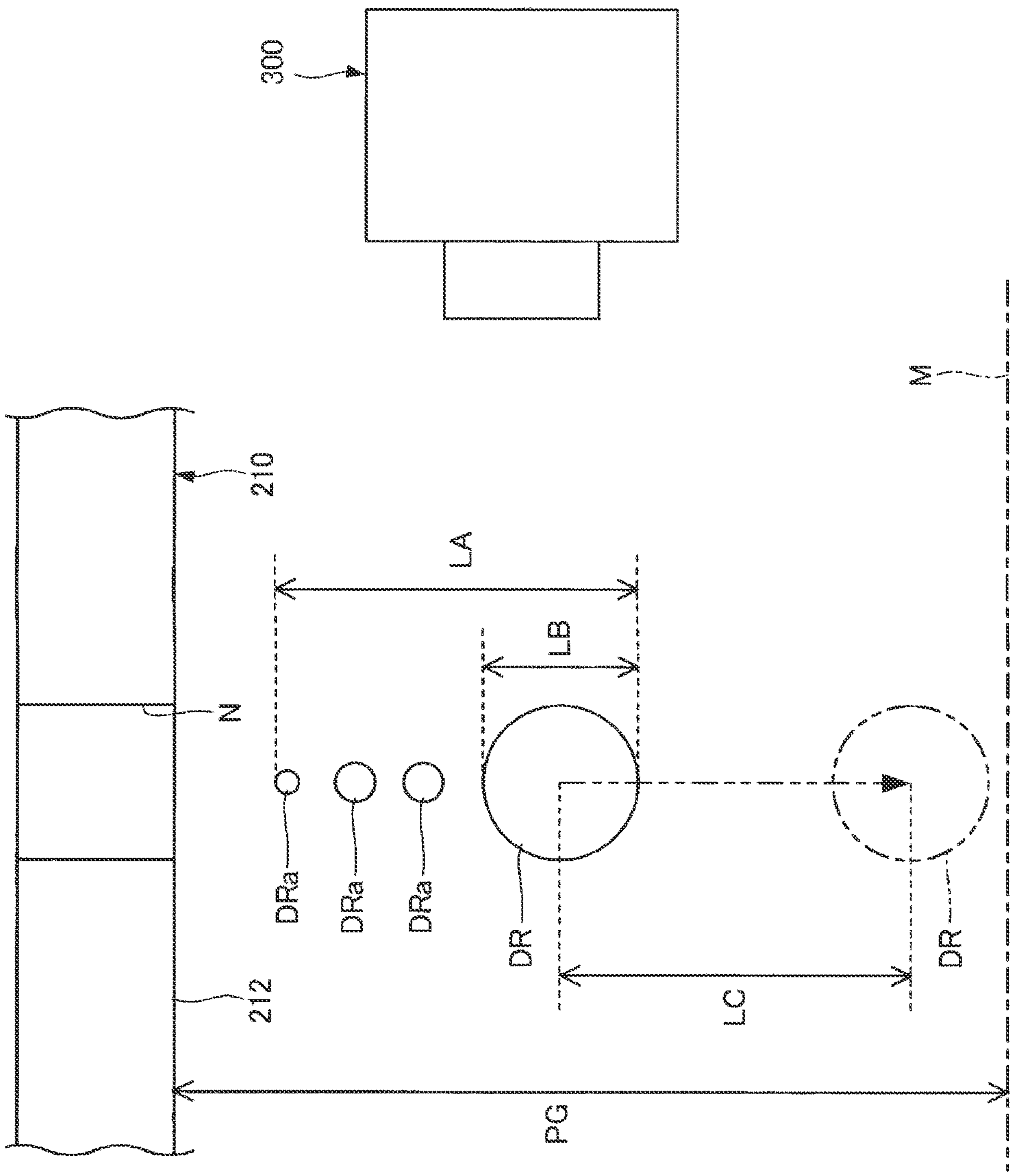
FIG. 3 is a diagram for describing the measurement of ejection characteristics of a droplet from a liquid ejecting head.

FIG. 3 is a diagram for describing the measurement of ejection characteristics of a droplet DR from the liquid ejecting head 210. As shown in FIG. 3, the measurement apparatus 300 captures an image of the flying state of the droplet DR of the ink ejected from a nozzle N of the liquid ejecting head 210 in a direction orthogonal to or intersecting the ejection direction.

In the example shown in FIG. 3, the liquid ejecting head 210 is provided with a nozzle surface 212 through which the nozzle N opens. The nozzle surface 212 is usually installed so as to be parallel to the printing surface of a recording medium M.

The droplet DR is the main droplet ejected from the nozzle N. In the example shown in FIG. 3, in addition to the droplet DR, a plurality of droplet DRa called satellites that are secondarily generated following the droplet DR with the generation of the droplet DR are ejected from the nozzle N. The droplet DRa has a smaller diameter than the droplet DR, and whether or not the droplet DRa is generated, the number of the droplets DRa, the size of the droplet DRa, and the like differ depending on the type of ink, the waveform of the drive pulse PD, and the like.

The measurement apparatus 300 continuously or intermittently images the flying droplet DR at minute time intervals. Based on the result of this imaging, an arrival timing of the droplet DR with respect to the recording medium M can be measured. Further, it is also possible to measure the position of the droplet DR at each predetermined timing based on the result of the measurement from the measurement apparatus 300, or to measure the ejection direction, ejection velocity, or landing position of the droplet DR based on the positions at a plurality of timings.

The timing at which the flight distance of the droplet DR from the liquid ejecting head 210 reaches a predetermined distance may be calculated based on the time when the flight distance of the droplet DR actually reaches the predetermined distance, or may be calculated based on the ejection velocity of the droplet DR and the predetermined distance. Here, when the predetermined distance is a distance PG between the nozzle surface 212 and the recording medium M, the timing at which the droplet DR reaches the recording medium M is measured.

The amount of the droplet DR from the liquid ejecting head 210 is calculated as the volume of the droplet DR based on a diameter LB of the droplet DR, for example, using the image captured by the measurement apparatus 300. The ejection velocity of the droplet DR from the liquid ejecting head 210 is calculated based on, for example, a distance LC and a time between any two positions of the flying droplet DR. In FIG. 3, the droplet DR after the predetermined time is shown by a two-dot chain line. The aspect ratio (LA/LB) of the ink from the liquid ejecting head 210 can also be calculated as the ink ejection characteristic. It is also possible to obtain the ejection angle of the ink from the liquid ejecting head 210 from the positional relationship of the droplets DR around the predetermined time. The amount of the droplet DR from the liquid ejecting head 210 may be calculated as the mass of the droplet DR based on the diameter LB of the droplet DR and the density of the droplet DR.

Figure 4:
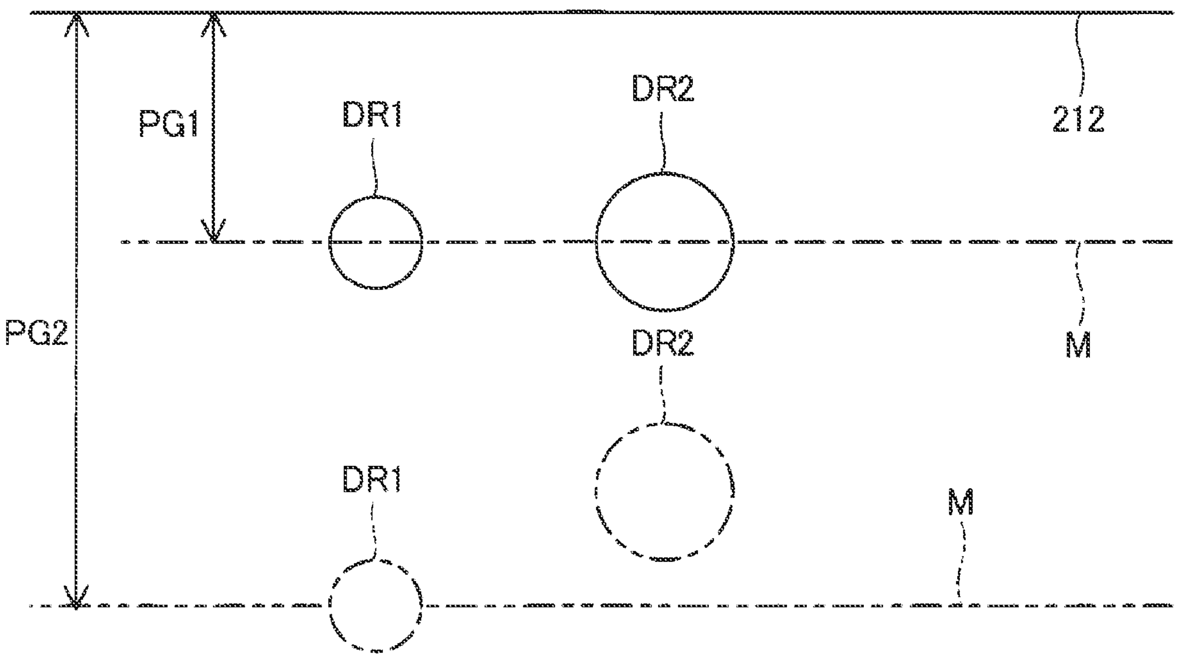
FIG. 4 is a diagram for describing a droplet used in the first embodiment.

FIG. 4 is a diagram for describing the droplet DR used in the first embodiment. As shown in FIG. 4, in the present embodiment, the first droplet DR1 and the second droplet DR2 are used as two types of droplet DR having different sizes from each other. That is, each nozzle N of the liquid ejecting head 210 selectively ejects the first droplet DR1 or the second droplet DR2. Here, the size of the second droplet DR2 is larger than the size of the first droplet DR1. The "size" of the droplet DR typically means volume, but may be diameter or mass.

In FIG. 4, the recording medium M when the distance PG is the first distance PG1 is shown by a one-dot chain line, and the recording medium M when the distance PG is the second distance PG2 longer than the first distance PG1 is shown by a two-dot chain line. When the timings at which the flight distances of the first droplet DR1 and the second droplet DR2 reach the first distance PG1 are the same as shown by a solid line in FIG. 4, as shown by the two-dot chain line in FIG. 4, the timing at which the flight distance of the second droplet DR2 reaches the second distance PG2 is later than the timing at which the flight distance of the first droplet DR1 reaches the second distance PG2. This is due to the reason that the air resistance of the second droplet DR2 is larger than the air resistance of the first droplet DR1.

Here, when the drive pulses PD for ejecting the first droplet DR1 and the second droplet DR2 are the same, the timings at which the flight distances of the first droplet DR1 and the second droplet DR2 reach the first distance PG1 are different from each other. Further, as described above, even though the drive pulses PD for ejecting the first droplet DR1 and the second droplet DR2 are different from each other so that the timings at which the flight distances of the first droplet DR1 and the second droplet DR2 reach the first distance PG1 are the same, the timing at which the flight distances of the first droplet DR1 and the second droplet DR2 reach the second distance PG2 will be different from each other as they are.

Therefore, in the drive waveform determination system 100, the waveform of the drive pulse PD is determined so that the timings at which the first droplet DR1 and the second droplet DR2 reach the recording medium M are the same even though the distance PG changes.

1-3. Waveform Example of Drive Pulse PD

FIG. 5 is a diagram showing a relationship between the drive pulse PD, the droplet DR, and the distance PG from the nozzle N to the recording medium M. As shown in FIG. 5, when the distance PG is the first distance PG1 and the droplet DR is the first droplet DR1, the first drive pulse PD1 is used as the drive pulse PD. That is, the first drive pulse PD1 is a drive pulse PD applied to the piezoelectric element 211 to eject the first droplet DR1 from the liquid ejecting head 210 toward the recording medium M located at a position separated by the first distance PG1 from the liquid ejecting head 210.

When the distance PG is the first distance PG1 and the droplet DR is the second droplet DR2, the second drive pulse PD2 is used as the drive pulse PD. That is, the second drive pulse PD2 is a drive pulse PD applied to the piezoelectric element 211 to eject the second droplet DR2 having a size larger than that of the first droplet DR1 from the liquid ejecting head 210 toward the recording medium M located at a position separated by the first distance PG1 from the liquid ejecting head 210.

When the distance PG is the second distance PG2 and the droplet DR is the first droplet DR1, the third drive pulse PD3 is used as the drive pulse PD. That is, the third drive pulse PD3 is a drive pulse PD applied to the piezoelectric element 211 to eject the first droplet DR1 from the liquid ejecting head 210 toward the recording medium M located at a position separated by the second distance PG2 longer than the first distance PG1 from the liquid ejecting head 210.

When the distance PG is the second distance PG2 and the droplet DR is the second droplet DR2, the fourth drive pulse PD4 is used as the drive pulse PD. That is, the fourth drive pulse PD4 is a drive pulse PD applied to the piezoelectric element 211 to eject the second droplet DR2 from the liquid ejecting head 210 toward the recording medium M located at a position separated by the second distance PG2 from the liquid ejecting head 210.

Figure 6:
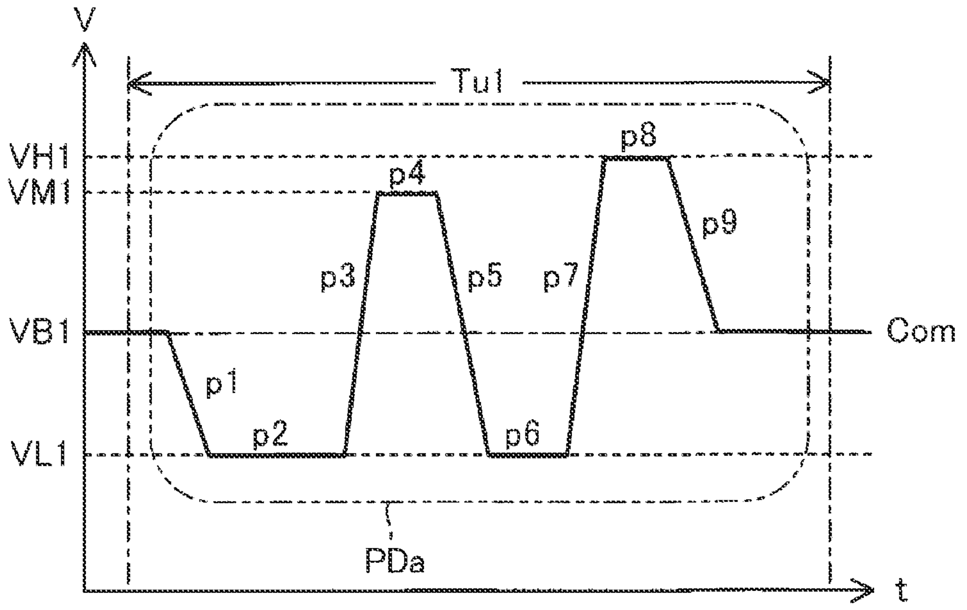
FIG. 6 is a diagram showing an example of a waveform of a drive pulse for a first droplet.

FIG. 6 is a diagram showing an example of the waveform of the drive pulse PD for the first droplet DR1. The waveform of each of the first drive pulse PD1 and the third drive pulse PD3 described above is determined with reference to, for example, a base waveform PDa as shown in FIG. 6.

The base waveform PDa is included in the drive signal Com for each unit period Tu1 within a predetermined cycle. In the example shown in FIG. 6, a potential V of the base waveform PDa drops from a first reference potential VB1 to a first potential VL1 lower than the first reference potential VB1, then rises to a potential VM1 higher than the first reference potential VB1, drops to the first potential VL1 again, rises to a second potential VH1 higher than the potential VM1, and then returns to the first reference potential VB1.

The drive pulse PD using such a base waveform PDa increases a pressure chamber of the liquid ejecting head 210 by changing from the first reference potential VB1 to the first potential VL1 and rapidly reduces the volume of the pressure chamber by changing from the first potential VL1 to the second potential VH1. Due to such a change in the volume of the pressure chamber, a part of the ink in the pressure chamber is ejected as the droplet DR from the nozzle N. Here, by changing from the first potential VL1 to the potential VM1 before changing from the first potential VL1 to the second potential VH1, the ejection characteristics of the droplet DR having a small diameter can be controlled more precisely than when a base waveform PDb to be described later is used.

The base waveform PDa as described above can be represented by a function using parameters p1, p2, p3, p4, p5, p6, p7, p8, and p9 corresponding to each change of the potential as described above. By changing each parameter of the function, the waveform of the first drive pulse PD1 or the third drive pulse PD3 can be adjusted. By this adjustment, the ejection characteristic of the first droplet DR1 from the liquid ejecting head 210 when the first drive pulse PD1 or the third drive pulse PD3 is used is adjusted.

Figure 7:
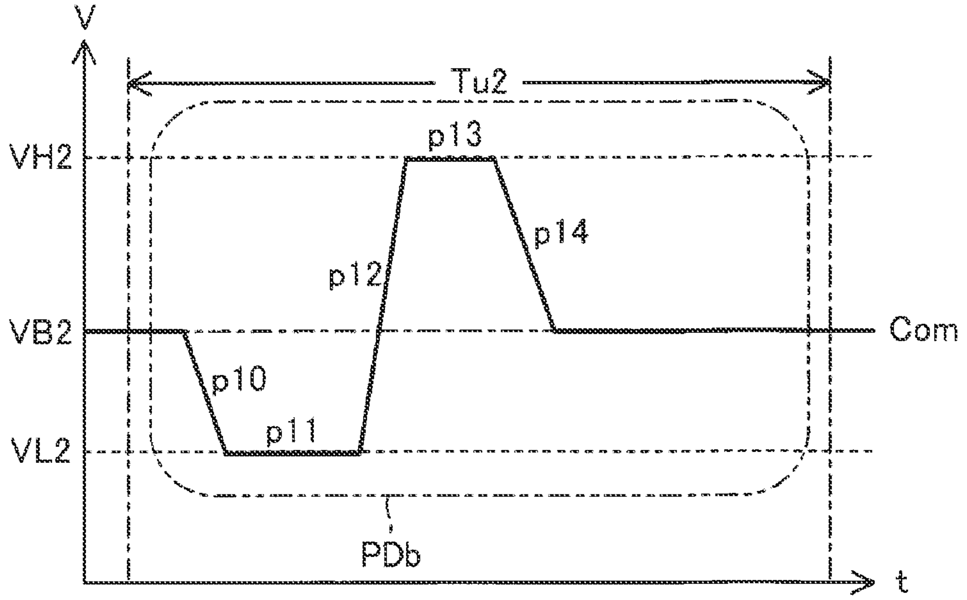
FIG. 7 is a diagram showing an example of a waveform of a drive pulse for a second droplet.

FIG. 7 is a diagram showing an example of the waveform of the drive pulse PD for the second droplet DR2. The waveform of each of the second drive pulse PD2 and the fourth drive pulse PD4 described above is determined with reference to, for example, a base waveform PDb as shown in FIG. 7.

The base waveform PDb is included in the drive signal Com for each unit period Tu2 within a predetermined cycle. Here, within the predetermined cycle, the above-mentioned unit period Tu1 is included as a period that does not overlap the unit period Tu2. In the example shown in FIG. 7, a potential V of the base waveform PDb drops from a second reference potential VB2 to a third potential VL2 lower than the second reference potential VB2, then rises to a fourth potential VH2 higher than the second reference potential VB2, and then returns to the second reference potential VB2.

The drive pulse PD using such a base waveform PDb increases a pressure chamber of the liquid ejecting head 210 by changing from the second reference potential VB2 to the third potential VL2 and rapidly reduces the volume of the pressure chamber by changing from the third potential VL2 to the fourth potential VH2. Due to such a change in the volume of the pressure chamber, a part of the ink in the pressure chamber is ejected as the droplet DR from the nozzle N.

The base waveform PDb as described above can be represented by a function using parameters p10, p11, p12, p13, and p14 corresponding to each change of the potential as described above. By changing each parameter of the function, the waveform of the second drive pulse PD2 or the fourth drive pulse PD4 can be adjusted. By this adjustment, the ejection characteristic of the second droplet DR2 from the liquid ejecting head 210 when the second drive pulse PD2 or the fourth drive pulse PD4 is used is adjusted.

1-4. Flow of Waveform Determination of Drive Pulse PD

Figure 8:
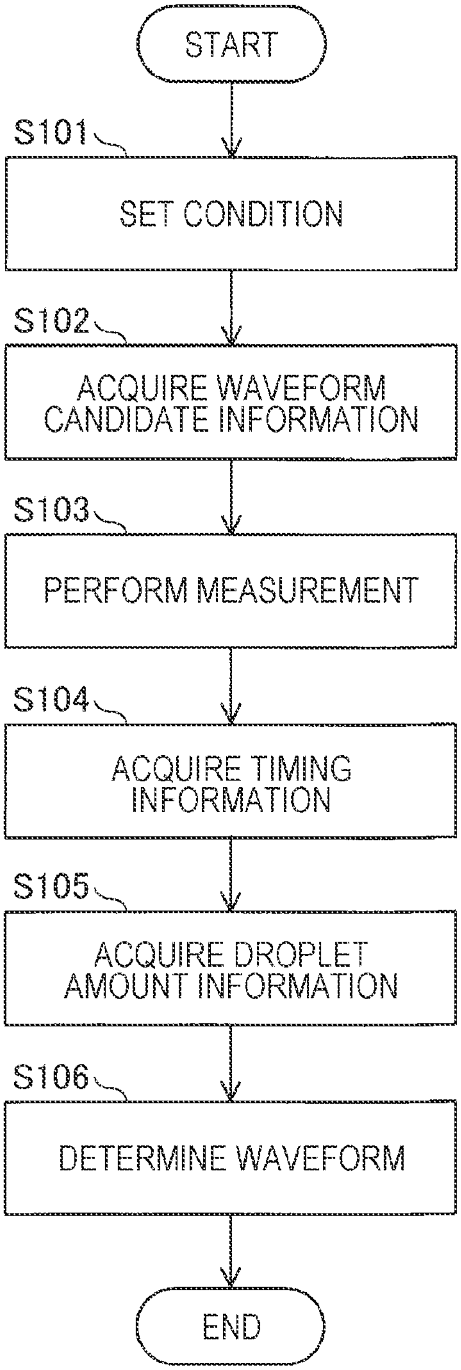
FIG. 8 is a flowchart showing a drive waveform determination method according to the first embodiment.

FIG. 8 is a flowchart showing a drive waveform determination method according to the first embodiment. The drive waveform determination method is performed using the drive waveform determination system 100 described above. As shown in FIG. 8, the drive waveform determination system 100 executes step S101, step S102 which is an example of a "first acquisition step", step S103, step S104 which is an example of a "second acquisition step", step S105 which is an example of a "third acquisition step", and step S106 which is an example of a "determination step" in this order. Hereinafter, each step will be described in order.

In step S101, the condition used by the first acquisition section 451 for determining the waveform of the drive pulse PD is set. This setting may be made in response to input to the input device 420 by the user or the like, or may be made automatically based on preset conditions. The condition is, for example, a value or range of one or more ejection characteristics required for each of the first drive pulse PD1, the second drive pulse PD2, the third drive pulse PD3, and the fourth drive pulse PD4.

In step S102, the first acquisition section 451 acquires the waveform candidate information DC. This acquisition is performed, for example, based on the setting content in step S101 described above. Here, it is preferable that the first reference potential VB1 of the first waveform information DC1, the second waveform information DC2, the third waveform information DC3 and the fourth waveform information DC4 are the same as each other. The waveform candidate information DC acquired in step S102 may be randomly generated information.

In step S104, the second acquisition section 452 executes the measurement by the measurement apparatus 300. This measurement is performed after driving the liquid ejecting head 210 by using each waveform candidate indicated by the waveform candidate information DC as the waveform of the drive pulse PD. Then, the measurement apparatus 300 is used to obtain measurement information regarding the ejection characteristics. This measurement information is stored in the storage circuit 440.

In step S105, the second acquisition section 452 acquires the timing information DT. This acquisition is performed by calculating the timing information DT based on the measurement information obtained in step S104.

In step S106, the third acquisition section 453 acquires the droplet amount information DM. This acquisition is performed by calculating the droplet amount information DM based on the measurement information obtained in step S104.

In step S107, the determination section 454 determines the waveform of the drive pulse PD. This determination is made based on the timing information DT obtained in step S105 and the droplet amount information DM obtained in step S106.

Here, the determination section 454 determines the waveforms of the first drive pulse PD1 and the second drive pulse PD2 so that a timing at which the flight distance of the first droplet DR1 becomes the first distance PG1 and a timing at which the flight distance of the second droplet DR2 becomes the first distance PG1 are equal to each other, based on the first timing information DT1 and the second timing information DT2 of the timing information DT.

In addition to the first timing information DT1 and the second timing information DT2, the first waveform information DC1 and the second waveform information DC2 of the waveform candidate information DC are used for this determination. A plurality of first waveform candidates indicated by the first waveform information DC1 are associated with a plurality of first timings indicated by the first timing information DT1, and the waveform of the first drive pulse PD1 is determined by selecting one or more first waveform candidates from the plurality of first waveform candidates indicated by the first waveform information DC1 based on the first timing information DT1 and the second timing information DT2. Similarly, a plurality of second waveform candidates indicated by the second waveform information DC2 are associated with a plurality of second timings indicated by the second timing information DT2, and the waveform of the second drive pulse PD2 is determined by selecting one or more second waveform candidates from the plurality of second waveform candidates indicated by the second waveform information DC2 based on the first timing information DT1 and the second timing information DT2.

The selection of the first waveform candidate and the second waveform candidate described above is performed by calculating a time difference between these timings as a difference for a plurality of combinations of the first timing of the first timing information DT1 and the second timing of the second timing information DT2 and then selecting the first waveform candidate and the second waveform candidate corresponding to the combination having the smallest difference among the plurality of combinations.

Meanwhile, in the selection, the first waveform candidate and the second waveform candidate corresponding to the combination that does not satisfy a predetermined constraint condition among the plurality of combinations are excluded based on the above-mentioned measurement information and the like. This constraint condition is set, for example, in step S101 described above. Examples of this constraint condition include, for example, that the difference between the first timing and the second timing is within a predetermined range, that the velocity of the first droplet DR1 is within a predetermined range, that the velocity of the second droplet DR2 is within a predetermined range, a case in which the satellite amount of the first droplet DR1 is equal to or less than a predetermined value, and that the satellite amount of the second droplet DR2 is equal to or less than a predetermined value.

Further, the determination section 454 determines the waveforms of the third drive pulse PD3 and the fourth drive pulse PD4 so that a timing at which the flight distance of the first droplet DR1 becomes the second distance PG2 and a timing at which the flight distance of the second droplet DR2 becomes the second distance PG2 are equal to each other, based on the third timing information DT3 and the fourth timing information DT4 of the timing information DT.

In addition to the third timing information DT3 and the fourth timing information DT4, the third waveform information DC3 and the fourth waveform information DC4 of the waveform candidate information DC are used for this determination. A plurality of third waveform candidates indicated by the third waveform information DC3 are associated with a plurality of third timings indicated by the third timing information DT3, and the waveform of the third drive pulse PD3 is determined by selecting one or more third waveform candidates from the plurality of third waveform candidates indicated by the third waveform information DC3 based on the third timing information DT3 and the fourth timing information DT4. Similarly, a plurality of fourth waveform candidates indicated by the fourth waveform information DC4 are associated with a plurality of fourth timings indicated by the fourth timing information DT4, and the waveform of the fourth drive pulse PD4 is determined by selecting one or more fourth waveform candidates from the plurality of fourth waveform candidates indicated by the fourth waveform information DC4 based on the third timing information DT3 and the fourth timing information DT4.

The selection of the third waveform candidate and the fourth waveform candidate described above is performed by calculating a time difference between these timings as a difference for a plurality of combinations of the third timing indicated by the third timing information DT3 and the fourth timing indicated by the fourth timing information DT4 and then selecting the third waveform candidate and the fourth waveform candidate corresponding to the combination having the smallest difference among the plurality of combinations.

Meanwhile, in the selection, the third waveform candidate and the fourth waveform candidate corresponding to the combination that does not satisfy a predetermined constraint condition among the plurality of combinations are excluded based on the above-mentioned measurement information and the like. This constraint condition is set, for example, in step S101 described above. Examples of this constraint condition include, for example, that the difference between the third timing and the fourth timing is within a predetermined range, that the velocity of the first droplet DR1 is within a predetermined range, that the velocity of the second droplet DR2 is within a predetermined range, a case in which the satellite amount of the first droplet DR1 is equal to or less than a predetermined value, that the satellite amount of the second droplet DR2 is equal to or less than a predetermined value, that the amount of the first droplet DR1 is within a predetermined range as compared with the case where the first drive pulse PD1 is used, and that the amount of the second droplet DR2 is within a predetermined range as compared with the case the second drive pulse PD2 is used.

In this manner, the waveforms of the first drive pulse PD1, the second drive pulse PD2, the third drive pulse PD3, and the fourth drive pulse PD4 are determined. In step S107, the determination section 454 determines whether or not the difference between the first timing and the second timing is within the desired range, and when the difference is not within the desired range, the determination section 454 may transition to the above-mentioned step S102 without determining the waveform. In this case, in step S102 again, at least one of the first waveform candidate and the second waveform candidate is changed. Similarly, in step S107, the determination section 454 determines whether or not the difference between the third timing and the fourth timing is within the desired range, and when the difference is not within the desired range, the determination section 454 may transition to the above-mentioned step S102 without determining the waveform. In this case, in step S102 again, at least one of the third waveform candidate and the fourth waveform candidate is changed.

As described above, the above-mentioned drive waveform determination system 100 includes the liquid ejecting head 210 and the processing circuit 450. The liquid ejecting head 210 includes the piezoelectric element 211 which is an example of a "drive element", and ink which is an example of a "liquid" is ejected as the droplet DR toward the recording medium M by driving the piezoelectric element 211. The processing circuit 450 performs processing of determining the waveform of the drive pulse PD applied to the piezoelectric element 211.

The drive waveform determination system 100 executes a drive waveform determination method for determining the waveform of the drive pulse PD. As described above, the drive waveform determination method includes step S102 which is an example of the "first acquisition step", step S104 which is an example of the "second acquisition step", and step S106 which is an example of the "determination step". These steps are executed by the processing circuit 450.

In Step S102, the first waveform information DC1 is acquired and the second waveform information DC2 is acquired. The first waveform information DC1 is information regarding a plurality of first waveform candidates of the first drive pulse PD1. The first drive pulse PD1 is a drive pulse PD applied to the piezoelectric element 211 to eject the first droplet DR1 from the liquid ejecting head 210 toward the recording medium M located at a position separated by the first distance PG1 from the liquid ejecting head 210. The second waveform information DC2 is information regarding a plurality of second waveform candidates of the second drive pulse PD2. The second drive pulse PD2 is a drive pulse PD applied to the piezoelectric element 211 to eject the second droplet DR2 having a size larger than that of the first droplet DR1 from the liquid ejecting head 210 toward the recording medium M located at a position separated by the first distance PG1 from the liquid ejecting head 210.

In Step S104, the first timing information DT1 is acquired and the second timing information DT2 is acquired. The first timing information DT1 is information regarding a first timing, which is a timing at which the flight distance of the droplet DR from the liquid ejecting head 210 reaches the first distance PG1 when each of the plurality of first waveform candidates indicated by the first waveform information DC1 is used as the waveform of the drive pulse PD applied to the piezoelectric element 211. The second timing information DT2 is information regarding a second timing, which is a timing at which the flight distance of the droplet DR from the liquid ejecting head 210 reaches the first distance PG1 when each of the plurality of second waveform candidates indicated by the second waveform information DC2 is used as the waveform of the drive pulse PD applied to the piezoelectric element 211.

In step S106, a waveform of each of the first drive pulse PD1 and the second drive pulse PD2 is determined based on the first timing information DT1 and the second timing information DT2.

In the above drive waveform determination method, since in step S106, the waveform of each of the first drive pulse PD1 and the second drive pulse PD2 is determined based on the first timing information DT1 and the second timing information DT2, it is possible to reduce the difference between the timing at which the flight distance of the first droplet DR1 from the liquid ejecting head 210 reaches the first distance PG1 and the timing at which the flight distance of the second droplet DR2 from the liquid ejecting head 210 reaches the first distance PG1. As a result, as compared with the related art, it is possible to reduce the deviation of the respective landing positions of the first droplet DR1 and the second droplet DR2 from the desired positions with respect to the recording medium M located at a position separated by the first distance PG1 from the liquid ejecting head 210.

In the present embodiment, as described above, in step S106, the waveform of each of the first drive pulse PD1 and the second drive pulse PD2 is determined based on the difference between the first timing and the second timing. Therefore, in step S106, the waveforms of the first drive pulse PD1 and the second drive pulse PD2 can be determined by selecting a combination of waveform candidates such that the difference between the first timing and the second timing becomes smaller from the plurality of waveform candidates indicated by the first waveform information DC1 and the second waveform information DC2, respectively.

Specifically, as described above, in step S106, the waveform of the first drive pulse PD1 and the waveform of the second drive pulse PD2 are determined by giving priority to the combination of the first waveform candidate and the second waveform candidate whose difference becomes smaller. For example, in step S106, the waveforms of the first drive pulse PD1 and the second drive pulse PD2 are determined based on the result of comparing the differences between the first timing and the second timing for a plurality of combinations of the first timing and the second timing. Here, the waveform of the first drive pulse PD1 is determined by selecting one or more first waveform candidates from the plurality of first waveform candidates indicated by the first waveform information DC1 based on the difference. Similarly, the waveform of the second drive pulse PD2 is determined by selecting one or more second waveform candidates from the plurality of second waveform candidates indicated by the second waveform information DC2 based on the difference.

More specifically, as described above, in step S106, a combination of the first waveform candidate and the second waveform candidate in which the difference is minimized is determined as the waveform of the first drive pulse PD1 and the waveform of the second drive pulse PD2. For example, in step S106, the waveforms of the first drive pulse PD1 and the second drive pulse PD2 are determined based on a combination in which the difference between the first timing and the second timing is minimized among a plurality of combinations of the first timing and the second timing. Here, the waveform of the first drive pulse PD1 is determined by selecting one or more first waveform candidates from the plurality of first waveform candidates indicated by the first waveform information DC1 based on the minimum combination. Similarly, the waveform of the second drive pulse PD2 is determined by selecting one or more second waveform candidates from the plurality of second waveform candidates indicated by the second waveform information DC2 based on the minimum combination.

Further, as described above, in step S102, in addition to the first waveform information DC1 and the second waveform information DC2, the third waveform information DC3 is acquired, and the fourth waveform information DC4 is acquired. The third waveform information DC3 is information regarding the plurality of third waveform candidates of the third drive pulse PD3. The third drive pulse PD3 is a drive pulse PD applied to the piezoelectric element 211 to eject the first droplet DR1 from the liquid ejecting head 210 toward the recording medium M located at a position separated by the second distance PG2 longer than the first distance PG1 from the liquid ejecting head 210. The fourth waveform information DC4 is information regarding the plurality of fourth waveform candidates of the fourth drive pulse PD4. The fourth drive pulse PD4 is a drive pulse PD applied to the piezoelectric element 211 to eject the second droplet DR2 from the liquid ejecting head 210 toward the recording medium M located at a position separated by the second distance PG2 from the liquid ejecting head 210.

Here, in step S104, in addition to the first timing information DT1 and the second timing information DT2, the third timing information DT3 is acquired, and the fourth timing information DT4 is acquired. The third timing information DT3 is information regarding a timing at which the flight distance of the droplet DR from the liquid ejecting head 210 reaches the second distance PG2 when each of the plurality of third waveform candidates indicated by the third waveform information DC3 is used as the waveform of the drive pulse PD applied to the piezoelectric element 211. The fourth timing information DT4 is information regarding a timing at which the flight distance of the droplet DR from the liquid ejecting head 210 reaches the second distance PG2 when each of the plurality of fourth waveform candidates indicated by the fourth waveform information DC4 is used as the waveform of the drive pulse PD applied to the piezoelectric element 211.

Then, in step S106, a waveform of each of the third drive pulse PD3 and the fourth drive pulse PD4 is determined based on the third timing information DT3 and the fourth timing information DT4. Therefore, it is possible to reduce the difference between the timing at which the flight distance of the first droplet DR1 from the liquid ejecting head 210 reaches the second distance PG2 and the timing at which the flight distance of the second droplet DR2 from the liquid ejecting head 210 reaches the second distance PG2. As a result, as compared with the related art, it is possible to reduce the deviation of the respective landing positions of the first droplet DR1 and the second droplet DR2 from the desired positions with respect to the recording medium M located at a position separated by the second distance PG2 from the liquid ejecting head 210.

As described above, the drive waveform determination method according to the present embodiment further includes step S105, which is an example of a "third acquisition step". Step S105 acquires the first amount information DM1, the second amount information DM2, the third amount information DM3, and the fourth amount information DM4.

The first amount information DM1 is information regarding the first amount, which is the amount of the droplet DR from the liquid ejecting head 210 when each of the plurality of first waveform candidates indicated by the first waveform information DC1 is used as the waveform of the drive pulse PD applied to the piezoelectric element 211. The second amount information DM2 is information regarding the second amount, which is the amount of the droplet DR from the liquid ejecting head 210 when each of the plurality of second waveform candidates indicated by the second waveform information DC2 is used as the waveform of the drive pulse PD applied to the piezoelectric element 211. The third amount information DM3 is information regarding the third amount, which is the amount of the droplet DR from the liquid ejecting head 210 when each of the plurality of third waveform candidates indicated by the third waveform information DC3 is used as the waveform of the drive pulse PD applied to the piezoelectric element 211. The fourth amount information DM4 is information regarding the fourth amount, which is the amount of the droplet DR from the liquid ejecting head 210 when each of the plurality of fourth waveform candidates indicated by the fourth waveform information DC4 is used as the waveform of the drive pulse PD applied to the piezoelectric element 211.

Then, in step S106, the waveform of each of the first drive pulse PD1, the second drive pulse PD2, the third drive pulse PD3, and the fourth drive pulse PD4 is determined by using the first amount information DM1, the second amount information DM2, the third amount information DM3, and the fourth amount information DM4. Therefore, it is possible to reduce the difference between the amount of the first droplet DR1 when the first drive pulse PD1 is used as the drive pulse PD and the amount of the first droplet DR1 when the third drive pulse PD3 is used as the drive pulse PD. Similarly, it is possible to reduce the difference between the amount of the second droplet DR2 when the second drive pulse PD2 is used as the drive pulse PD and the amount of the second droplet DR2 when the fourth drive pulse PD4 is used as the drive pulse PD.

In the present embodiment, as described above, in step S106, the waveform of the first drive pulse PD1 is determined and the waveform of the third drive pulse PD3 is determined by giving priority to the combination of the first amount and the third amount in which the difference between the first amount and the third amount is small, and the waveform of the second drive pulse PD2 is determined and the waveform of the fourth drive pulse PD4 is determined by giving priority to the combination of the second amount and the fourth amount in which the difference between the second amount and the fourth amount is small. For example, in step S106, the waveforms of the first drive pulse PD1 and the third drive pulse PD3 are determined based on the result of comparing the differences between the first amount and the third amount for a plurality of combinations of the first amount and the third amount, and the waveforms of the second drive pulse PD2 and the fourth drive pulse PD4 are determined based on the result of comparing the differences between the second amount and the fourth amount for a plurality of combinations of the second amount and the fourth amount.

Here, the waveform of the first drive pulse PD1 is determined by selecting one or more waveform candidates from the plurality of waveform candidates indicated by the first waveform information DC1 based on the result of comparing the differences between the first amount and the third amount for the plurality of combinations of the first amount and the third amount. The waveform of the third drive pulse PD3 is determined by selecting one or more waveform candidates from the plurality of waveform candidates indicated by the third waveform information DC3 based on the result of comparing the differences between the first amount and the third amount for the plurality of combinations of the first amount and the third amount.

Similarly, the waveform of the second drive pulse PD2 is determined by selecting one or more waveform candidates from the plurality of waveform candidates indicated by the second waveform information DC2 based on the result of comparing the differences between the second amount and the fourth amount for the plurality of combinations of the second amount and the fourth amount. The waveform of the fourth drive pulse PD4 is determined by selecting one or more waveform candidates from the plurality of waveform candidates indicated by the fourth waveform information DC4 based on the result of comparing the differences between the second amount and the fourth amount for the plurality of combinations of the second amount and the fourth amount.

Further, as described above, in step S106, the waveform of the first drive pulse PD1 is determined by selecting one or more waveform candidates in which the velocity of the first droplet DR1 is within a predetermined range from the plurality of waveform candidates indicated by the first waveform information DC1. Further, in step S106, the waveform of the third drive pulse PD3 is determined by selecting one or more waveform candidates in which the velocity of the first droplet DR1 is within the predetermined range from the plurality of waveform candidates indicated by the third waveform information DC3. Therefore, it is possible to reduce the difference in image quality between the case where the distance PG is the first distance PG1 and the case where the distance PG is the second distance PG2. In this regard, the determination of the waveforms of the second drive pulse PD2 and the fourth drive pulse PD4 is performed in the same manner as the determination of the waveforms of the first drive pulse PD1 and the third drive pulse PD3.

From the same viewpoint, as described above, in step S106, the waveform of the first drive pulse PD1 is determined by selecting one or more waveform candidates in which the satellite amount of the first droplet DR1 is equal to or less than a predetermined value from the plurality of waveform candidates indicated by the first waveform information DC1. Further, in step S106, the waveform of the third drive pulse PD3 is determined by selecting a waveform candidate in which the satellite amount of the first droplet DR1 is equal to or less than the predetermined value from a plurality of waveform candidates indicated by fifth waveform information DC5. Therefore, also in this regard, it is possible to reduce the difference in image quality between the case where the distance PG is the first distance PG1 and the case where the distance PG is the second distance PG2. In this regard, the determination of the waveforms of the second drive pulse PD2 and the fourth drive pulse PD4 is performed in the same manner as the determination of the waveforms of the first drive pulse PD1 and the third drive pulse PD3.

Further, in the present embodiment, as described above, in step S104, the first timing information DT1 and the second timing information DT2 are acquired based on the result of imaging from the measurement apparatus 300 which is an example of an "imaging section". The measurement apparatus 300 images the flying droplet DR ejected from the liquid ejecting head 210. Therefore, it is possible to acquire not only the first timing information DT1 and the second timing information DT2 but also the ejection characteristics such as the ejection velocity or the amount of the droplet DR based on the result of imaging from the measurement apparatus 300. Further, in the present embodiment, the acquisition of the third timing information DT3 and the fourth timing information DT4 is also performed based on the result of imaging from the measurement apparatus 300, similarly to the acquisition of the first timing information DT1 and the second timing information DT2.

In step S104, the first timing information DT1 and the second timing information DT2 may be acquired based on the result of detection from the optical sensor that detects the passage of the flying droplet DR ejected from the liquid ejecting head 210. In this case, there is an advantage that less arithmetic processing is required to acquire the first timing information DT1 and the second timing information DT2 as compared with the case of using the above-mentioned imaging result. Here, the acquisition of the third timing information DT3 and the fourth timing information DT4 can also be performed based on the result of detection from the optical sensor, similarly to the acquisition of the first timing information DT1 and the second timing information DT2. The optical sensor may be used instead of the measurement apparatus 300, or may be used in combination with the measurement apparatus 300.

Further, as described above, the first drive pulse PD1 includes a first state in which the first reference potential VB1 changes to the first potential VL1 lower than the first reference potential VB1, a second state in which after the first state, the first potential VL1 changes to the second potential VH1 higher than the first reference potential VB1, and a third state in which after the second state, the second potential VH1 changes to the first reference potential VB1. In the first drive pulse PD1 having such a waveform, not only can the first droplet DR1 be efficiently ejected from the liquid ejecting head 210, but there is also an advantage that the ejection velocity of the first droplet DR1 can be easily adjusted according to the magnitudes of the first potential VL1 and the second potential VH1 or the like.

Further, as described above, the second drive pulse PD2 includes a fourth state in which the second reference potential VB2 changes to the third potential VL2 lower than the second reference potential VB2, a fifth state in which after the fourth state, the third potential VL2 changes to the fourth potential VH2 higher than the second reference potential VB2, and a sixth state in which after the fifth state, the fourth potential VH2 changes to the second reference potential VB2. In the second drive pulse PD2 having such a waveform, not only can the second droplet DR2 be efficiently ejected from the liquid ejecting head 210, but there is also an advantage that the ejection velocity of the second droplet DR2 can be easily adjusted according to the magnitudes of the third potential VL2 and the fourth potential VH2 or the like.

Here, in step S106, it is preferable to determine the waveform of each of the first drive pulse PD1 and the second drive pulse PD2 so that the first reference potential VB1 and the second reference potential VB2 are equal to each other. In this case, the calculation for determining the first drive pulse PD1 and the second drive pulse PD2 can be simplified as compared with the case where the first reference potential VB1 and the second reference potential VB2 are also adjusted.

2. Second Embodiment

Hereinafter, a second embodiment of the present disclosure will be described. The reference numerals used in the description of the first embodiment are given to the same elements as those of the first embodiment in the operations and functions in embodiments exemplified below, and the detailed description thereof will be appropriately omitted.

Figure 9:
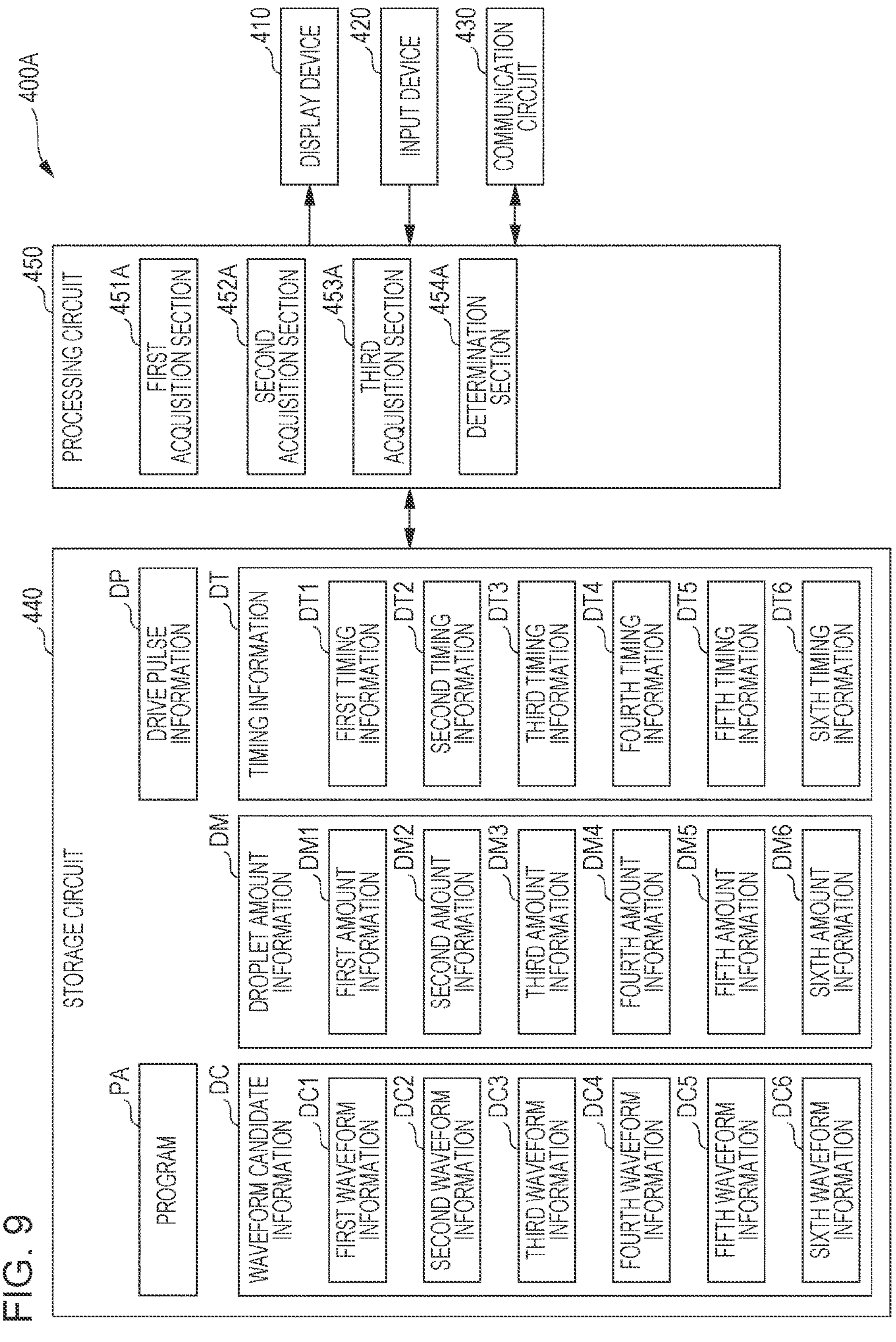
FIG. 9 is a schematic diagram showing a configuration example of an information processing apparatus according to a second embodiment.

FIG. 9 is a schematic diagram showing a configuration example of an information processing apparatus 400A according to a second embodiment. The information processing apparatus 400A is the same as the information processing apparatus 400 of the first embodiment described above, except that it has a program PA instead of the program P as a drive waveform determination program.

In the information processing apparatus 400A, the processing circuit 450 functions as a first acquisition section 451A, a second acquisition section 452A, a third acquisition section 453A, and a determination section 454A by reading and executing the program PA from the storage circuit 440.

The first acquisition section 451A has a "first acquisition function" of acquiring the waveform candidate information DC. The second acquisition section 452A has a "second acquisition function" of acquiring the timing information DT. The third acquisition section 453A has a "third acquisition function" of acquiring the droplet amount information DM. The determination section 454A has a "determination function" of determining the waveform of the drive pulse PD, and generates the drive pulse information DP.

The drive pulse information DP of the present embodiment includes information regarding waveforms of a fifth drive pulse PD5 and a sixth drive pulse PD6, which will be described later, in addition to the first drive pulse PD1, the second drive pulse PD2, the third drive pulse PD3, and the fourth drive pulse PD4.

The waveform candidate information DC of the present embodiment includes fifth waveform information DC5 and sixth waveform information DC6 in addition to the first waveform information DC1, the second waveform information DC2, the third waveform information DC3, and the fourth waveform information DC4. The fifth waveform information DC5 is information regarding a plurality of waveform candidates of the fifth drive pulse PD5, which will be described later. The sixth waveform information DC6 is information regarding a plurality of waveform candidates of the sixth drive pulse PD6, which will be described later. In the following description, each of the plurality of waveform candidates indicated by the fifth waveform information DC5 may be referred to as a "fifth waveform candidate". Each of the plurality of waveform candidates indicated by the sixth waveform information DC6 may be referred to as a "sixth waveform candidate".

The timing information DT of the present embodiment includes fifth timing information DT5 and sixth timing information DT6 in addition to the first timing information DT1, the second timing information DT2, the third timing information DT3, and the fourth timing information DT4.

The fifth timing information DT5 is information regarding a timing at which the flight distance of the droplet from the liquid ejecting head 210 reaches the first distance PG1 when each of the plurality of waveform candidates indicated by the fifth waveform information DC5 is used as the waveform of the drive pulse PD. The sixth timing information DT6 is information regarding a timing at which the flight distance of the droplet from the liquid ejecting head 210 reaches the second distance PG2 when each of the plurality of waveform candidates indicated by the sixth waveform information DC6 is used as the waveform of the drive pulse PD. In the following description, each of the plurality of timings indicated by the fifth timing information DT5 may be referred to as a "fifth timing". Each of the plurality of timings indicated by the sixth timing information DT6 may be referred to as a "sixth timing".

The droplet amount information DM of the present embodiment includes fifth amount information DM5 and sixth amount information DM6 in addition to the first amount information DM1, the second amount information DM2, the third amount information DM3, and the fourth amount information DM4. The fifth amount information DM5 is information regarding the amount of droplets from the liquid ejecting head 210 when each of the plurality of waveform candidates indicated by the fifth waveform information DC5 is used as the waveform of the drive pulse PD. The sixth amount information DM6 is information regarding the amount of droplets from the liquid ejecting head 210 when each of the plurality of waveform candidates indicated by the sixth waveform information DC6 is used as the waveform of the drive pulse PD. In the following description, each of the plurality of amounts indicated by the fifth amount information DM5 may be referred to as a "fifth amount". Each of the plurality of amounts indicated by the sixth amount information DM6 may be referred to as a "sixth amount".

Figure 10:
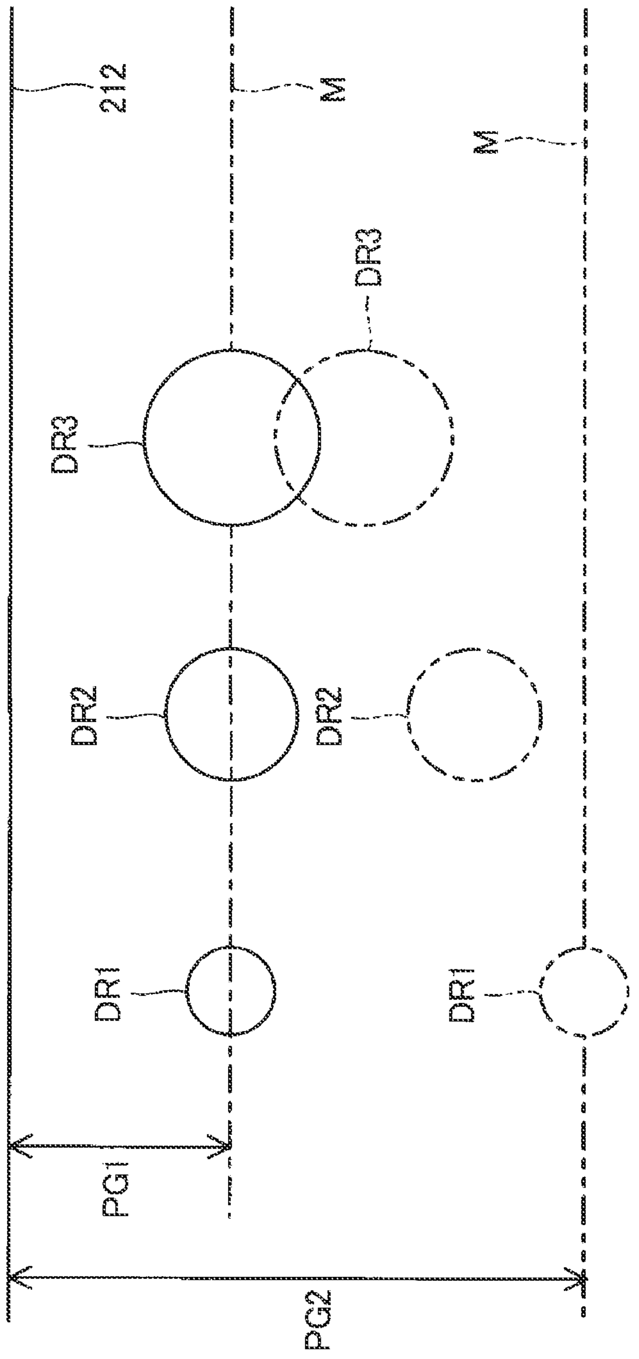
FIG. 10 is a diagram for describing a droplet used in the second embodiment.

FIG. 10 is a diagram for describing the droplet DR used in the second embodiment. As shown in FIG. 10, in the present embodiment, the first droplet DR1, the second droplet DR2, and the third droplet DR3 are used as the three types of droplet DR having different sizes from each other. That is, each nozzle N of the liquid ejecting head 210 selectively ejects the first droplet DR1, the second droplet DR2, or the third droplet DR3. Here, the size of the third droplet DR3 is larger than the size of the second droplet DR2.

In FIG. 10, the recording medium M when the distance PG is the first distance PG1 is shown by a one-dot chain line, and the recording medium M when the distance PG is the second distance PG2 longer than the first distance PG1 is shown by a two-dot chain line. When the timings at which the flight distances of the first droplet DR1, the second droplet DR2, and the third droplet DR3 reach the first distance PG1 are the same as shown by a solid line in FIG. 10, as shown by the two-dot chain line in FIG. 10, the timing at which the flight distance of the third droplet DR3 reaches the second distance PG2 is later than the timing at which the flight distance of the second droplet DR2 reaches the second distance PG2.

In the present embodiment, the waveform of the drive pulse PD is determined so that the timings at which the first droplet DR1, the second droplet DR2, and the third droplet DR3 reach the recording medium M are the same even though the distance PG changes.

Figure 11:
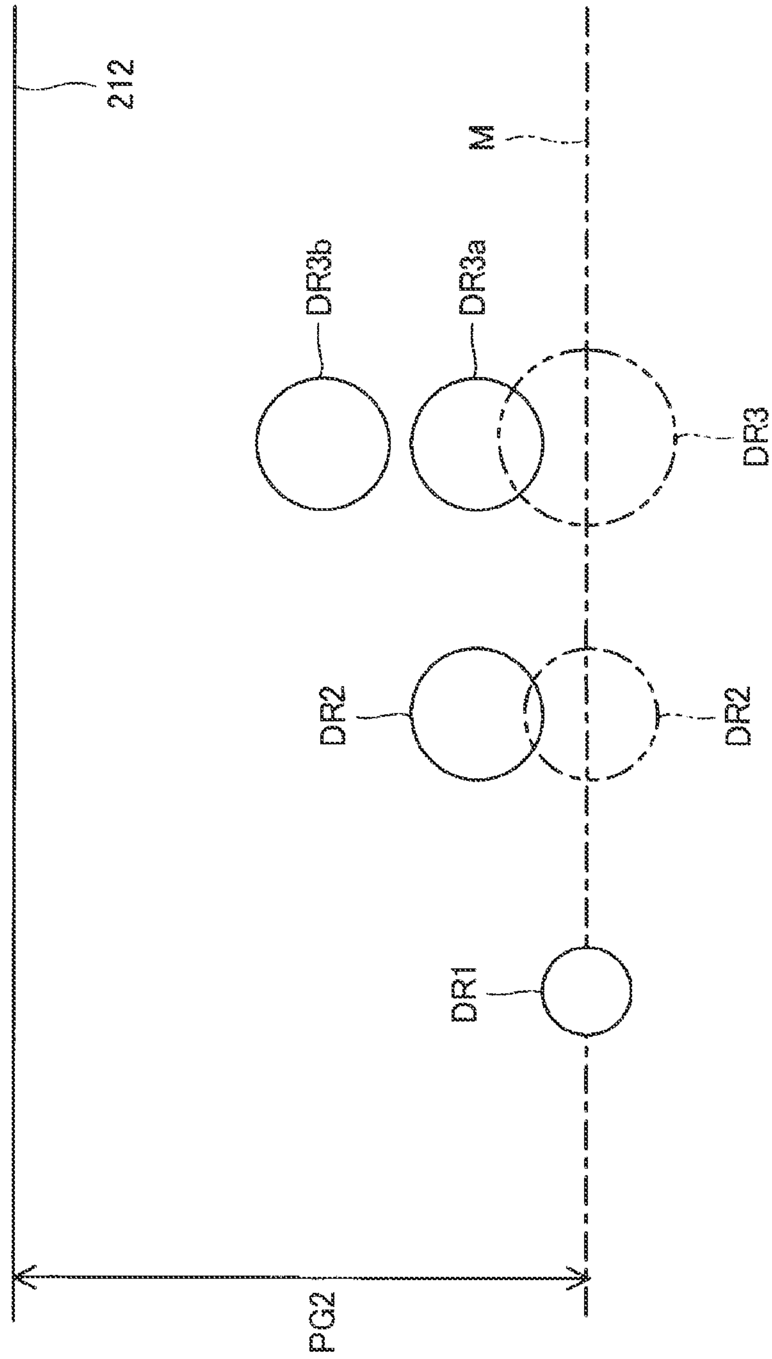
FIG. 11 is a diagram for describing a third droplet formed by coalescence of two droplets.

FIG. 11 is a diagram for describing a third droplet DR3 by coalescence of two droplets DR3*a* and DR3*b*. When the third droplet DR3 is landed on the recording medium M, as shown by a solid line in FIG. 11, two droplets DR3*a* and DR3*b* having substantially the same size as the second droplet DR2 are ejected. As shown by a two-dot chain line in FIG. 11, these droplets are coalesced at the time of landing on the recording medium M or before landing to become the third droplet DR3.

Since each of the droplet DR3*a* and the droplet DR3*b* has substantially the same size as the second droplet DR2, it is not easily affected by air resistance and the like as compared with the case where the third droplet DR3 is directly ejected from the nozzle N. Therefore, there is an advantage that it is easy to match the landing timing of the second droplet DR2 and the third droplet DR3 on the recording medium M. Further, there is also an advantage that a droplet DR having a size larger than that of the second droplet DR2 can be easily formed as compared with the case where the third droplet DR3 is directly ejected from the nozzle N.

FIG. 12 is a diagram showing the relationship between the drive pulse PD, the droplet DR, and the distance PG in the second embodiment. As shown in FIG. 12, in the present embodiment, as the drive pulse PD, in addition to the first drive pulse PD1, the second drive pulse PD2, the third drive pulse PD3, and the fourth drive pulse PD4, the fifth drive pulse PD5 and the sixth drive pulse PD6 are used.

Here, the fifth drive pulse PD5 is a drive pulse PD applied to the piezoelectric element 211 to eject the third droplet DR3 having a size larger than that of the second droplet DR2 from the liquid ejecting head 210 toward the recording medium M located at a position separated by the first distance PG1 from the liquid ejecting head 210. The sixth drive pulse PD6 is a drive pulse PD applied to the piezoelectric element 211 to eject the third droplet DR3 from the liquid ejecting head 210 toward the recording medium M located at a position separated by the second distance PG2 from the liquid ejecting head 210.

Figure 13:
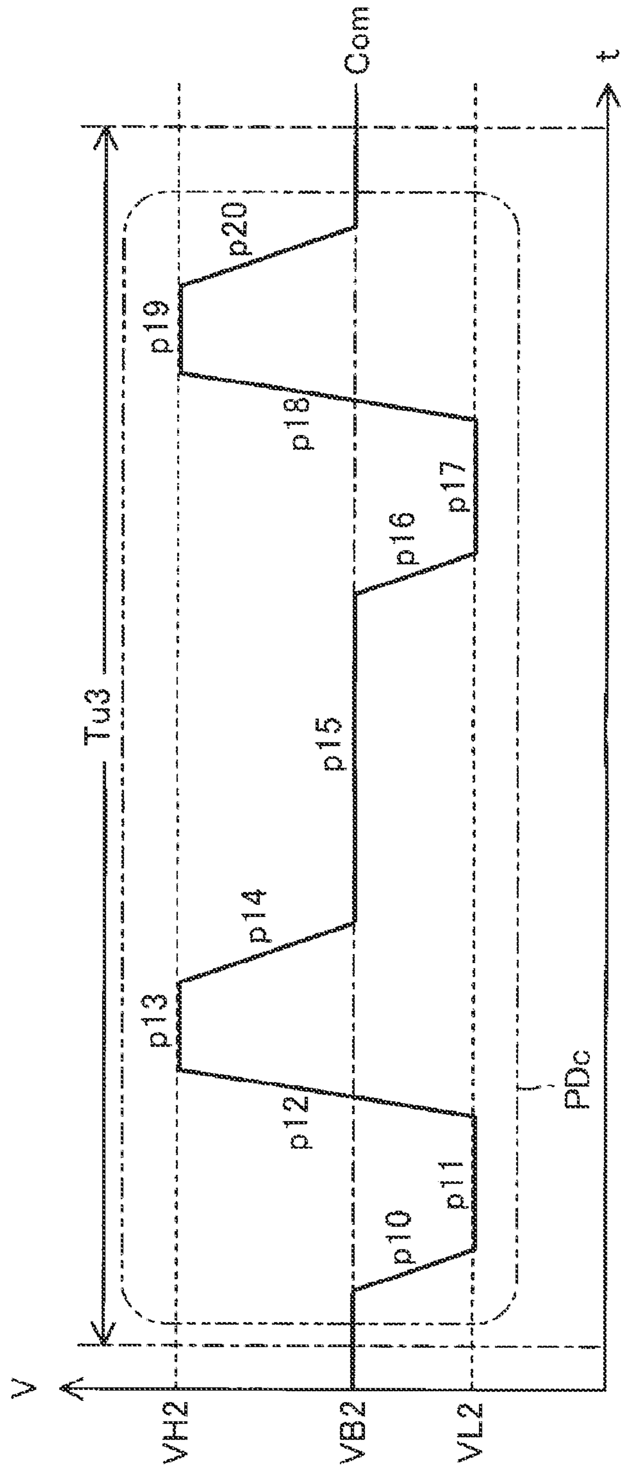
FIG. 13 is a diagram showing an example of a waveform of a drive pulse for the third droplet.

FIG. 13 is a diagram showing an example of the waveform of the drive pulse PD for the third droplet DR3. The respective waveforms of the fifth drive pulse PD5 and the sixth drive pulse PD6 described above are determined with reference to, for example, a base waveform PDc as shown in FIG. 13.

The base waveform PDc is included in the drive signal Com for each unit period Tu3 within a predetermined cycle. Here, the above-mentioned unit period Tu1 and unit period Tu2 are included in the predetermined cycle, and the unit period Tu3 is a period that does not overlap the unit period Tu1, but includes the unit period Tu2. In the example shown in FIG. 13, the base waveform PDc is a waveform in which two base waveforms PDb are arranged over time at minute time intervals. That is, a potential V of the base waveform PDc drops from the second reference potential VB2 to the third potential VL2 lower than the second reference potential VB2, then rises to the fourth potential VH2 higher than the second reference potential VB2, then returns to the second reference potential VB2, and further drops from the second reference potential VB2 to the third potential VL2 lower than the second reference potential VB2, then rises to the fourth potential VH2 higher than the second reference potential VB2, and then returns to the second reference potential VB2.

The drive pulse PD using such a base waveform PDc causes a change in the volume of the pressure chamber twice continuously at a minute time interval when the above-mentioned base waveform PDb is used. Therefore, the above-mentioned droplet DR3*a* and droplet DR3*b* are continuously ejected from the nozzle N as two droplets DR.

The base waveform PDc as described above can be represented by a function using parameters p10 to p20 corresponding to each change of the potential as described above. By changing each parameter of the function, the waveform of the fifth drive pulse PD5 or the sixth drive pulse PD6 can be adjusted. By this adjustment, the ejection characteristic of the third droplet DR3 from the liquid ejecting head 210 when the fifth drive pulse PD5 or the sixth drive pulse PD6 is used is adjusted.

In the drive waveform determination method of the present embodiment using the information processing apparatus 400A as described above, the first acquisition step is the same as that of step S102 of the first embodiment described above, except that acquisition of the fifth waveform information DC5 and the sixth waveform information DC6 is added. The acquisition of each of the fifth waveform information DC5 and the sixth waveform information DC6 is performed in the same manner as the first waveform information DC1 and the like, except that the matters associated with the difference in the size of the droplet DR are different from each other.

The second acquisition step of the present embodiment is the same as that of step S104 of the first embodiment described above, except that the acquisition of the fifth timing information DT5 and the sixth timing information DT6 is added. The acquisition of the fifth timing information DT5 is performed in the same manner as the first waveform information DC1 and the like, except that a plurality of fifth waveform candidates indicated by the fifth waveform information DC5 are used as the plurality of waveform candidates. Similarly, the acquisition of the sixth timing information DT6 is performed in the same manner as the first waveform information DC1 and the like, except that a plurality of sixth waveform candidates indicated by the sixth waveform information DC6 are used as the plurality of waveform candidates.

The determination step of the present embodiment is the same as that of step S106 of the first embodiment described above, except that the determination of the waveforms of the fifth drive pulse PD5 and the sixth drive pulse PD6 is added. The determination of the waveform of the fifth drive pulse PD5 is performed together with the determination of the waveforms of the first drive pulse PD1 and the second drive pulse PD2 based on the first timing information DT1, the second timing information DT2, and the fifth timing information DT5. Similarly, the determination of the waveform of the sixth drive pulse PD6 is performed together with the determination of the waveforms of the third drive pulse PD3 and the fourth drive pulse PD4 based on the third timing information DT3, the fourth timing information DT4, and the sixth timing information DT6.

As described above, in the determination step of the present embodiment, the waveforms of the first drive pulse PD1, the second drive pulse PD2, and the fifth drive pulse PD5 are determined by giving priority to a combination of the first timing and the second timing in which a difference between the first timing and the second timing is small and a combination of the first timing and the fifth timing in which a difference between the first timing and the fifth timing is small. For example, in the determination step of the present embodiment, the waveforms of the first drive pulse PD1, the second drive pulse PD2, and the fifth drive pulse PD5 are determined based on the result of comparing the differences between the first timing and the second timing for a plurality of combinations of the first timing and the second timing and the result of comparing the differences between the first timing and the fifth timing for a plurality of combinations of the first timing and the fifth timing.

Here, the determination of the waveform of the first drive pulse PD1 is performed by selecting one or more waveform candidates from the plurality of waveform candidates indicated by the first waveform information DC1 based on the results of the above two comparisons. The determination of the waveform of the second drive pulse PD2 is performed by selecting one or more waveform candidates from the plurality of waveform candidates indicated by the second waveform information DC2 based on the results of the above two comparisons. The determination of the waveform of the fifth drive pulse PD5 is performed by selecting one or more waveform candidates from the plurality of waveform candidates indicated by the fifth waveform information DC5 based on the results of the above-mentioned two comparisons. From the above description, it is possible to reduce the deviation of the landing timing of the droplet DR on the recording medium M when the first drive pulse PD1, the second drive pulse PD2, and the fifth drive pulse PD5 are used. The selection of the waveform candidate described above is performed by preferentially selecting the waveform candidate having the smaller result of the above-mentioned two comparisons from the plurality of waveform candidates.

As described above, the third droplet DR3 is formed by coalescing a plurality of droplets DR3*a* and droplets DR3*b* ejected from the liquid ejecting head 210 during flight. Therefore, as compared with the configuration in which the third droplet DR3 is ejected as one droplet from the liquid ejecting head 210, the landing timing of the third droplet DR3 on the recording medium M can be easily adjusted.

Meanwhile, depending on the distance PG, the third droplet DR3 may be ejected as one droplet from the liquid ejecting head 210. In this case, since it is not necessary to consider the timing of coalescence as described above, it is advantageous when the distance PG is smaller than the configuration in which coalescence is performed as described above.

3. Modification Example

The drive waveform determination method, drive waveform determination program, and drive waveform determination system according to the present disclosure have been described above based on the illustrated embodiments, but the present disclosure is not limited thereto. Further, the configuration of each section of the present disclosure can be replaced with any configuration that exhibits the same function as that of the above-mentioned embodiment, or any configuration can be added.

3-1. Modification Example 1

Although the configuration in which the program P or the program PA is executed by a processing circuit provided in the same device as the storage circuit to be installed has been exemplified in the above-mentioned embodiments, the present disclosure is not limited to the configuration, and it may be executed by a processing circuit provided in a device different from the storage circuit to be installed. For example, as in the first embodiment, the program P stored in the storage circuit 440 of the information processing apparatus 400 may be executed by the processing circuit 280 of the liquid ejecting apparatus 200.

What is claimed is:

1. A drive waveform determination method for determining a waveform of a drive pulse applied to a drive element provided in a liquid ejecting head that ejects a liquid as a droplet toward a recording medium, the drive waveform determination method comprising:

a first acquisition step of acquiring first waveform information regarding a plurality of first waveform candidates of a first drive pulse applied to the drive element to eject a first droplet from the liquid ejecting head toward a recording medium located at a position separated by a first distance from the liquid ejecting head, and acquiring second waveform information regarding a plurality of second waveform candidates of a second drive pulse applied to the drive element to eject a second droplet having a size larger than that of the first droplet from the liquid ejecting head toward the recording medium located at the position separated by the first distance from the liquid ejecting head;

a second acquisition step of acquiring first timing information regarding a first timing, which is a timing at which a flight distance of the droplet from the liquid ejecting head reaches the first distance when each of the plurality of first waveform candidates is used as the waveform of the drive pulse applied to the drive element, and acquiring second timing information regarding a second timing, which is a timing at which the flight distance of the droplet from the liquid ejecting head reaches the first distance when each of the plurality of second waveform candidates is used as the waveform of the drive pulse applied to the drive element; and a determination step of determining a waveform of each of the first drive pulse and the second drive pulse based on the first timing information and the second timing information.

2. The drive waveform determination method according to claim 1, wherein in the determination step, a waveform of each of the first drive pulse and the second drive pulse is determined based on a difference between the first timing and the second timing.

3. The drive waveform determination method according to claim 2, wherein in the determination step, the waveform of the first drive pulse and the waveform of the second drive pulse are determined by giving priority to a combination of the first waveform candidate and the second waveform candidate in which the difference between the first timing and the second timing is small.

4. The drive waveform determination method according to claim 3, wherein in the determination step, a combination of the first waveform candidate and the second waveform candidate in which the difference is minimized is determined as the waveform of the first drive pulse and the waveform of the second drive pulse.

5. The drive waveform determination method according to claim 1, wherein in the first acquisition step, third waveform information regarding a plurality of third waveform candidates of a third drive pulse applied to the drive element to eject the first droplet from the liquid ejecting head toward a recording medium located at a position separated by a second distance longer than the first distance from the liquid ejecting head is acquired, and fourth waveform information regarding a plurality of fourth waveform candidates of a fourth drive pulse applied to the drive element to eject the second droplet from the liquid ejecting head toward the recording medium located at the position separated by the second distance from the liquid ejecting head is acquired, in the second acquisition step, third timing information regarding a third timing, which is a timing at which the flight distance of the droplet from the liquid ejecting head reaches the second distance when each of the plurality of third waveform candidates is used as the waveform of the drive pulse applied to the drive element is acquired, and fourth timing information regarding a fourth timing, which is a timing at which the flight distance of the droplet from the liquid ejecting head reaches the second distance when each of the plurality of fourth waveform candidates is used as the waveform of the drive pulse applied to the drive element is acquired, and in the determination step, a waveform of each of the third drive pulse and the fourth drive pulse is determined based on the third timing information and the fourth timing information.

6. The drive waveform determination method according to claim 5, further comprising:

a third acquisition step of acquiring first amount information regarding a first amount, which is an amount of droplets from the liquid ejecting head when each of the plurality of first waveform candidates is used as the waveform of the drive pulse applied to the drive element, second amount information regarding a second amount, which is the amount of droplets from the liquid ejecting head when each of the plurality of second waveform candidates is used as the waveform of the drive pulse applied to the drive element, third amount information regarding a third amount, which is the amount of droplets from the liquid ejecting head when each of the plurality of third waveform candidates is used as the waveform of the drive pulse applied to the drive element, and fourth amount information regarding a fourth amount, which is the amount of droplets from the liquid ejecting head when each of the plurality of fourth waveform candidates is used as the waveform of the drive pulse applied to the drive element, wherein in the determination step, a waveform of each of the first drive pulse, the second drive pulse, the third drive pulse, and the fourth drive pulse is determined by using the first amount information, the second amount information, the third amount information, and the fourth amount information.

7. The drive waveform determination method according to claim 6, wherein in the determination step, the waveform of the first drive pulse is determined and the waveform of the third drive pulse is determined by giving priority to a combination of the first amount and the third amount in which a difference between the first amount and the third amount is small, and the waveform of the second drive pulse is determined and the waveform of the fourth drive pulse is determined by giving priority to a combination of the second amount and the fourth amount in which a difference between the second amount and the fourth amount is small.

8. The drive waveform determination method according to claim 1, wherein in the first acquisition step, fifth waveform information regarding a plurality of fifth waveform candidates of a fifth drive pulse applied to the drive element to eject a third droplet having a size larger than that of the second droplet from the liquid ejecting head toward the recording medium located at the position separated by the first distance from the liquid ejecting head is acquired, in the second acquisition step, fifth timing information regarding a fifth timing, which is a timing at which the flight distance of the droplet from the liquid ejecting head reaches the first distance when each of the plurality of fifth waveform candidates is used as the waveform of the drive pulse applied to the drive element is acquired, and in the determination step, a waveform of each of the first drive pulse, the second drive pulse, and the fifth drive pulse is determined based on the first timing information, the second timing information, and the fifth timing information.

9. The drive waveform determination method according to claim 8, wherein in the determination step, the waveforms of the first drive pulse, the second drive pulse, and the fifth drive pulse are determined by giving priority to a combination of the first timing and the second timing in which a difference between the first timing and the second timing is small and a combination of the first timing and the fifth timing in which a difference between the first timing and the fifth timing is small.

10. The drive waveform determination method according to claim 8, wherein the third droplet is formed by coalescing a plurality of droplets ejected from the liquid ejecting head during flight.

11. The drive waveform determination method according to claim 8, wherein the third droplet is ejected as one droplet from the liquid ejecting head.

12. The drive waveform determination method according to claim 5, wherein in the determination step, the waveform of the first drive pulse is determined by selecting one or more waveform candidates in which a velocity of the first droplet is within a predetermined range from a plurality of waveform candidates indicated by the first waveform information, and the waveform of the third drive pulse is determined by selecting one or more waveform candidates in which the velocity of the first droplet is within the predetermined range from a plurality of waveform candidates indicated by the third waveform information.

13. The drive waveform determination method according to claim 5, wherein in the determination step, the waveform of the first drive pulse is determined by selecting one or more waveform candidates in which a satellite amount of the first droplet is equal to or less than a predetermined value from a plurality of waveform candidates indicated by the first waveform information, and the waveform of the third drive pulse is determined by selecting waveform candidates in which the satellite amount of the first droplet is equal to or less than the predetermined value from a plurality of waveform candidates indicated by the third waveform information.

14. The drive waveform determination method according to claim 1, wherein in the second acquisition step, the first timing information and the second timing information are acquired based on a result of imaging from an imaging section that images the flying droplet ejected from the liquid ejecting head.

15. The drive waveform determination method according to claim 1, wherein in the second acquisition step, the first timing information and the second timing information are acquired based on a result of detection from an optical sensor that detects a passage of the flying droplet ejected from the liquid ejecting head.

16. The drive waveform determination method according to claim 1, wherein the first drive pulse includes a first state in which a first reference potential changes to a first potential lower than the first reference potential, a second state in which after the first state, the first potential changes to a second potential higher than the first reference potential, and a third state in which after the second state, the second potential changes to the first reference potential, and the second drive pulse includes a fourth state in which a second reference potential changes to a third potential lower than the second reference potential, a fifth state in which after the fourth state, the third potential changes to a fourth potential higher than the second reference potential, and a sixth state in which after the fifth state, the fourth potential changes to the second reference potential.

17. The drive waveform determination method according to claim 16, wherein in the determination step, a waveform of each of the first drive pulse and the second drive pulse is determined so that the first reference potential and the second reference potential are equal to each other.

18. A non-transitory computer-readable storage medium storing a drive waveform determination program for determining a waveform of a drive pulse applied to a drive element provided in a liquid ejecting head that ejects a liquid as a droplet toward a recording medium, the drive waveform determination program causing a computer to realize:

a first acquisition function of acquiring first waveform information regarding a plurality of first waveform candidates of a first drive pulse applied to the drive element to eject a first droplet from the liquid ejecting head toward a recording medium located at a position separated by a first distance from the liquid ejecting head, and acquiring second waveform information regarding a plurality of second waveform candidates of a second drive pulse applied to the drive element to eject a second droplet having a size larger than that of the first droplet from the liquid ejecting head toward the recording medium located at the position separated by the first distance from the liquid ejecting head;

a second acquisition function of acquiring first timing information regarding a first timing, which is a timing at which a flight distance of the droplet from the liquid ejecting head reaches the first distance when each of the plurality of first waveform candidates is used as the waveform of the drive pulse applied to the drive element, and acquiring second timing information regarding a second timing, which is a timing at which the flight distance of the droplet from the liquid ejecting head reaches the first distance when each of the plurality of second waveform candidates is used as the waveform of the drive pulse applied to the drive element; and a determination function of determining a waveform of each of the first drive pulse and the second drive pulse based on the first timing information and the second timing information.

19. A drive waveform determination system comprising:

a liquid ejecting head that includes a drive element and ejects a liquid as a droplet toward a recording medium by driving the drive element; and a processing circuit that performs processing of determining a waveform of a drive pulse applied to the drive element, wherein the processing circuit executes a first acquisition step of acquiring first waveform information regarding a plurality of first waveform candidates of a first drive pulse applied to the drive element to eject a first droplet from the liquid ejecting head toward a recording medium located at a position separated by a first distance from the liquid ejecting head, and acquiring second waveform information regarding a plurality of second waveform candidates of a second drive pulse applied to the drive element to eject a second droplet having a size larger than that of the first droplet from the liquid ejecting head toward the recording medium located at the position separated by the first distance from the liquid ejecting head, a second acquisition step of acquiring first timing information regarding a first timing, which is a timing at which a flight distance of the droplet from the liquid ejecting head reaches the first distance when each of the plurality of first waveform candidates is used as the waveform of the drive pulse applied to the drive element, and acquiring second timing information regarding a second timing, which is a timing at which the flight distance of the droplet from the liquid ejecting head reaches the first distance when each of the plurality of second waveform candidates is used as the waveform of the drive pulse applied to the drive element, and a determination step of determining a waveform of each of the first drive pulse and the second drive pulse based on the first timing information and the second timing information.

* * * * *